US012608409B2

(12) United States Patent
Masui

(10) Patent No.: US 12,608,409 B2
(45) Date of Patent: Apr. 21, 2026

(54) INFORMATION PROCESSING DEVICE, INFORMATION PROCESSING METHOD, AND PROGRAM

(71) Applicant: HELPFEEL INC., Kyoto (JP)

(72) Inventor: Toshiyuki Masui, Kyoto (JP)

(73) Assignee: HELPFEEL INC., Kyoto (JP)

( * ) Notice: Subject to any disclaimer, the term of this patent is extended or adjusted under 35 U.S.C. 154(b) by 229 days.

(21) Appl. No.: 18/256,391

(22) PCT Filed: Dec. 8, 2021

(86) PCT No.: PCT/JP2021/045154

§ 371 (c)(1),
(2) Date: Jun. 7, 2023

(87) PCT Pub. No.: WO2022/124339

PCT Pub. Date: Jun. 16, 2022

(65) Prior Publication Data

US 2024/0020471 A1      Jan. 18, 2024

(30) Foreign Application Priority Data

Dec. 8, 2020    (JP) ................................. 2020-203632
Dec. 8, 2020    (JP) ................................. 2020-203633

(51) Int. Cl.
G06F 16/3332      (2025.01)
G06F 16/3329      (2025.01)
G06F 40/242      (2020.01)

(52) U.S. Cl.
CPC ...... *G06F 16/3334* (2019.01); *G06F 16/3329* (2019.01); *G06F 40/242* (2020.01)

(58) Field of Classification Search
CPC . G06F 16/3334; G06F 16/3329; G06F 40/242
See application file for complete search history.

(56) References Cited

U.S. PATENT DOCUMENTS 10,185,748 B1    1/2019  Ayzenshtat et al.
10,885,076 B2    1/2021  Zhang
(Continued)

FOREIGN PATENT DOCUMENTS

JP        2004-102818 A      4/2004
JP        2013-077084 A      4/2013
(Continued)

OTHER PUBLICATIONS

USPTO, Final Office Action issued Nov. 4, 2024 in the U.S. Appl. No. 18/256,392.
(Continued)

*Primary Examiner* — Bhavesh M Mehta
*Assistant Examiner* — Edward Tracy, Jr.
(74) *Attorney, Agent, or Firm* — SoCal IP Law Group LLP; Mark Andrew Goldstein

(57)      ABSTRACT

An information processing device, method and program enabling a user to arrive easily at a desired target text is described. A keyword accepting unit accepts a keyword relating to a target text, where the target text is an answer to a FAQ or a product description. A guidance text candidate extracting unit extracts a guidance text candidate including the keyword from within a guidance text dictionary containing guidance text candidates intended for the user to reach a target text have been registered in advance in association with a plurality of target texts. A guidance text candidate presenting unit presents guidance text candidates based on the extracted guidance text candidates to the user. A target text presenting unit extracts from the guidance text dictionary a target text associated with a guidance text candidate selected by the user from the presented guidance text candidates and presents the target text to the user.

7 Claims, 13 Drawing Sheets

(56) References Cited

U.S. PATENT DOCUMENTS

| | | | |
|---|---|---|---|
| 2015/0178267 A1* | 6/2015 | Heo | G06F 40/30 |
| | | | 707/722 |
| 2016/0255139 A1 | 9/2016 | Rathod | |
| 2020/0104427 A1* | 4/2020 | Long | G06N 3/04 |
| 2020/0242144 A1 | 7/2020 | Yoshida et al. | |
| 2020/0243082 A1 | 7/2020 | Yoshida et al. | |
| 2020/0394229 A1* | 12/2020 | Tuboguchi | G06F 16/93 |
| 2021/0089715 A1* | 3/2021 | Asano | G06F 40/279 |
| 2021/0097236 A1 | 4/2021 | Fujimoto et al. | |
| 2022/0208213 A1* | 6/2022 | Watanabe | G06F 40/30 |

FOREIGN PATENT DOCUMENTS

| | | |
|---|---|---|
| JP | 2015056014 A | 3/2015 |
| JP | 2020-123132 A | 8/2020 |
| JP | 2020-123131 A | 12/2020 |
| KR | 10-2113009 B1 | 5/2020 |
| WO | 2014103645 A1 | 7/2014 |
| WO | 2019-193796 A1 | 10/2019 |
| WO | 2022124339 A1 | 6/2022 |

OTHER PUBLICATIONS

EUIPO, Office Action issued Nov. 22, 2024 in the EP Patent Application No. 21903437.8.

USPTO, Brotherston et al., U.S. Pat. No. 9,122,376 B1, issue date Sep. 1, 2015.

European Patent Office, Extended European Search Report issued in the EP Patent Application No. 21903437.8, mailed on Feb. 29, 2024.

USPTO Office Action issued in the U.S. Appl. No. 18/256,392, mailed on Apr. 22, 2024.

Japan Patent Office, International Search Report and Written Opinion for PCT Application No. PCT/JP2021/045154. Mail date Feb. 1, 2022.

Japan Patent Office, Notification of Reasons for Refusal for Japanese Application No. 2022-113503. Mail date Aug. 19, 2025.

* cited by examiner

Figures 2A, 2B:
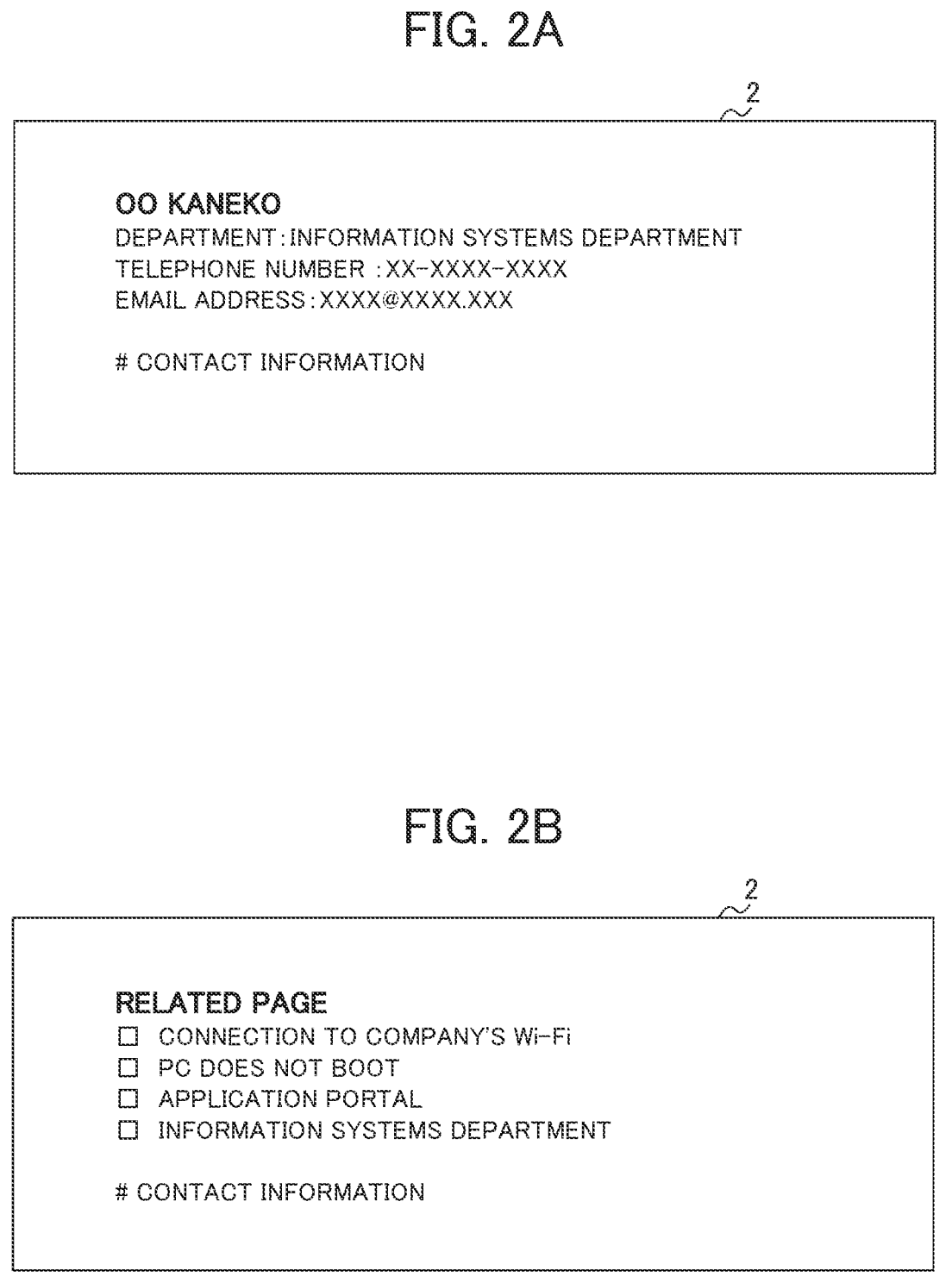

OO KANEKO
DEPARTMENT:INFORMATION SYSTEMS DEPARTMENT
TELEPHONE NUMBER :XX-XXXX-XXXX
EMAIL ADDRESS:XXXX@XXXX.XXX

CONTACT INFORMATION

RELATED PAGE
☐ CONNECTION TO COMPANY'S Wi-Fi
☐ PC DOES NOT BOOT
☐ APPLICATION PORTAL
☐ INFORMATION SYSTEMS DEPARTMENT

CONTACT INFORMATION

Figure 3:
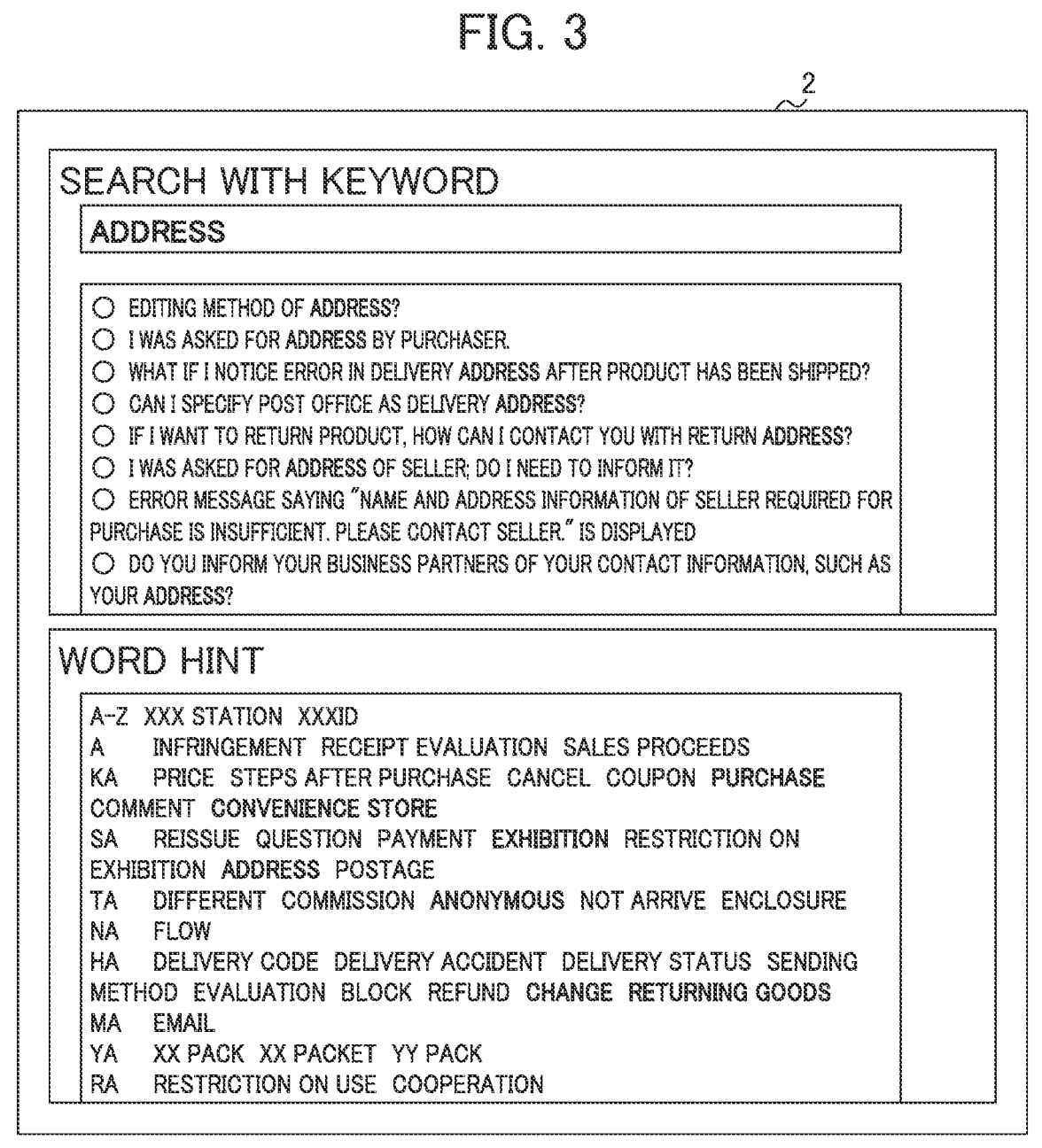

SEARCH WITH KEYWORD

ADDRESS

○ EDITING METHOD OF ADDRESS?
○ I WAS ASKED FOR ADDRESS BY PURCHASER.
○ WHAT IF I NOTICE ERROR IN DELIVERY ADDRESS AFTER PRODUCT HAS BEEN SHIPPED?
○ CAN I SPECIFY POST OFFICE AS DELIVERY ADDRESS?
○ IF I WANT TO RETURN PRODUCT, HOW CAN I CONTACT YOU WITH RETURN ADDRESS?
○ I WAS ASKED FOR ADDRESS OF SELLER; DO I NEED TO INFORM IT?
○ ERROR MESSAGE SAYING "NAME AND ADDRESS INFORMATION OF SELLER REQUIRED FOR PURCHASE IS INSUFFICIENT. PLEASE CONTACT SELLER." IS DISPLAYED
○ DO YOU INFORM YOUR BUSINESS PARTNERS OF YOUR CONTACT INFORMATION, SUCH AS YOUR ADDRESS?

WORD HINT

A-Z  XXX STATION  XXXID
A      INFRINGEMENT  RECEIPT EVALUATION  SALES PROCEEDS
KA    PRICE  STEPS AFTER PURCHASE  CANCEL  COUPON  PURCHASE COMMENT  CONVENIENCE STORE
SA    REISSUE  QUESTION  PAYMENT  EXHIBITION  RESTRICTION ON EXHIBITION  ADDRESS  POSTAGE
TA    DIFFERENT  COMMISSION  ANONYMOUS  NOT ARRIVE  ENCLOSURE
NA    FLOW
HA    DELIVERY CODE  DELIVERY ACCIDENT  DELIVERY STATUS  SENDING METHOD  EVALUATION  BLOCK  REFUND  CHANGE  RETURNING GOODS
MA    EMAIL
YA    XX PACK  XX PACKET  YY PACK
RA    RESTRICTION ON USE  COOPERATION

FIG. 7

Q LOST

・REQUEST METHOD FOR HOUSING LOAN
    IT IS POSSIBLE TO PROPOSE METHOD TO
ELIMINATE ..., AND ...
・WHEN LOGIN METHOD IS UNCLEAR
    ... FOR INQUIRIES ABOUT NOT DISPLAYING
PASSWORD STORAGE PERIOD, PLEASE CONTACT ...
・ABOUT REGISTRATION OF NOTIFICATION SEAL
    ... IN THAT CASE, YOU DO NOT HAVE TO SEND
RESIDENT CARD OF PLACE OF RESIDENCE ...

CANNOT CHOOSE BECAUSE OF TOO
MANY IRRELEVANT ANSWERS

THERE MAY BE CORRECT ANSWER SOMEWHERE,
BUT I DON'T KNOW WHICH ONE TO PRESS
YOU HAVE TO LOOK AT IT FROM TOP TO BOTTOM

FIG. 9

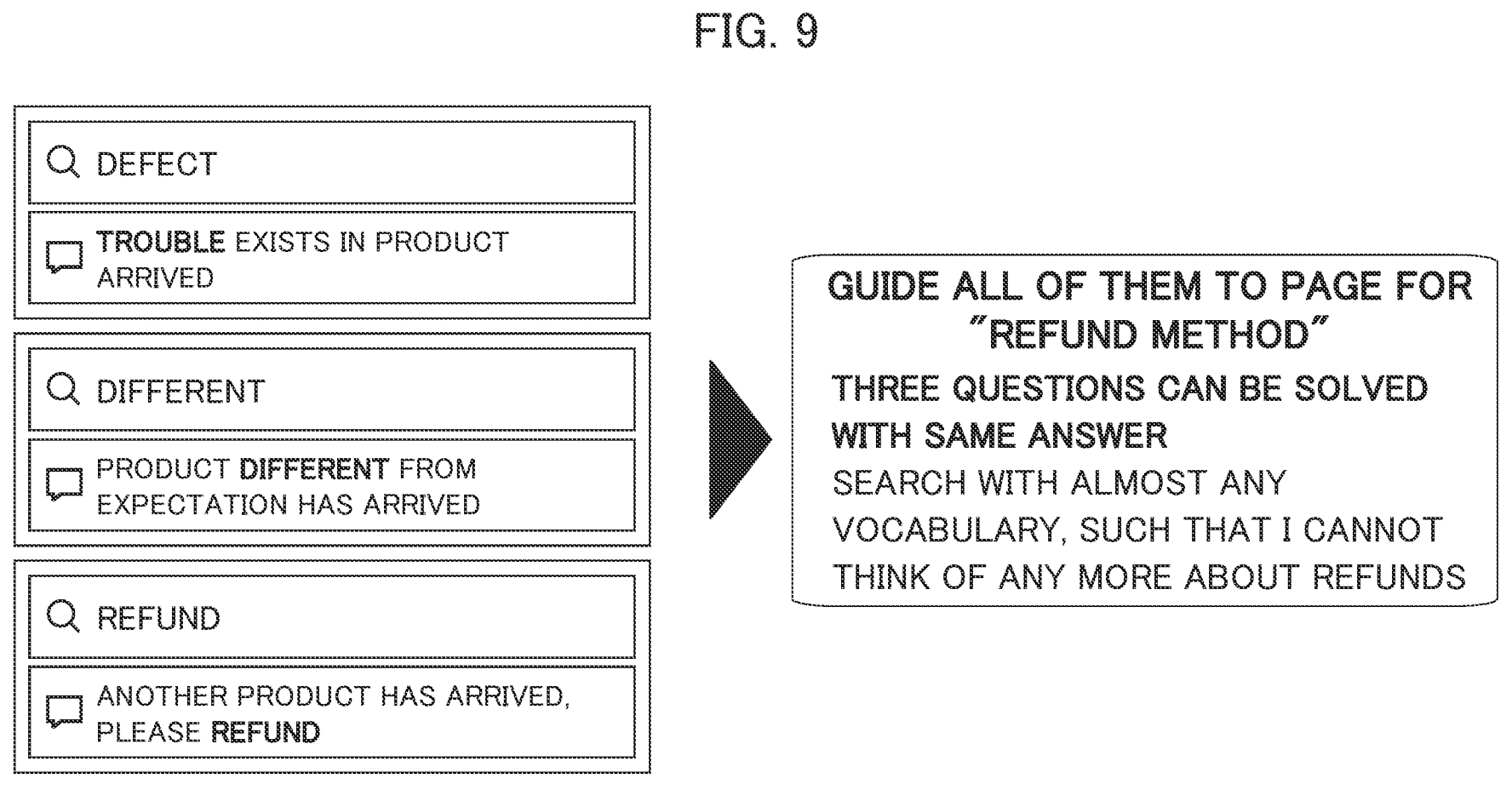

GUIDE ALL OF THEM TO PAGE FOR "REFUND METHOD"

THREE QUESTIONS CAN BE SOLVED WITH SAME ANSWER

SEARCH WITH ALMOST ANY VOCABULARY, SUCH THAT I CANNOT THINK OF ANY MORE ABOUT REFUNDS

Q DEFECT

☐ TROUBLE EXISTS IN PRODUCT ARRIVED

Q DIFFERENT

☐ PRODUCT DIFFERENT FROM EXPECTATION HAS ARRIVED

Q REFUND

☐ ANOTHER PRODUCT HAS ARRIVED, PLEASE REFUND

Figure 10:
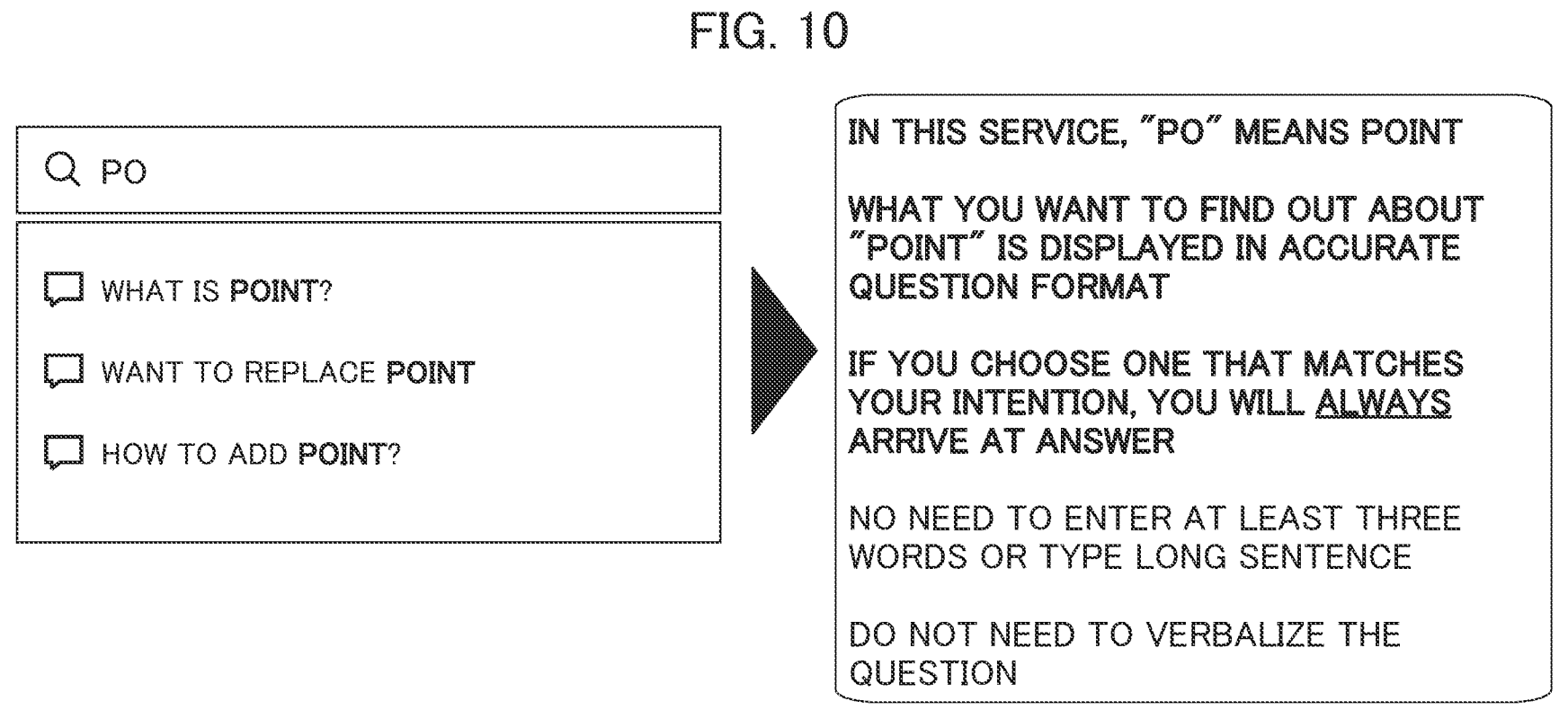

☐ WHAT IS POINT?

☐ WANT TO REPLACE POINT

☐ HOW TO ADD POINT?

IN THIS SERVICE, "PO" MEANS POINT

WHAT YOU WANT TO FIND OUT ABOUT "POINT" IS DISPLAYED IN ACCURATE QUESTION FORMAT

IF YOU CHOOSE ONE THAT MATCHES YOUR INTENTION, YOU WILL ALWAYS ARRIVE AT ANSWER

NO NEED TO ENTER AT LEAST THREE WORDS OR TYPE LONG SENTENCE

DO NOT NEED TO VERBALIZE THE QUESTION

FIG. 11

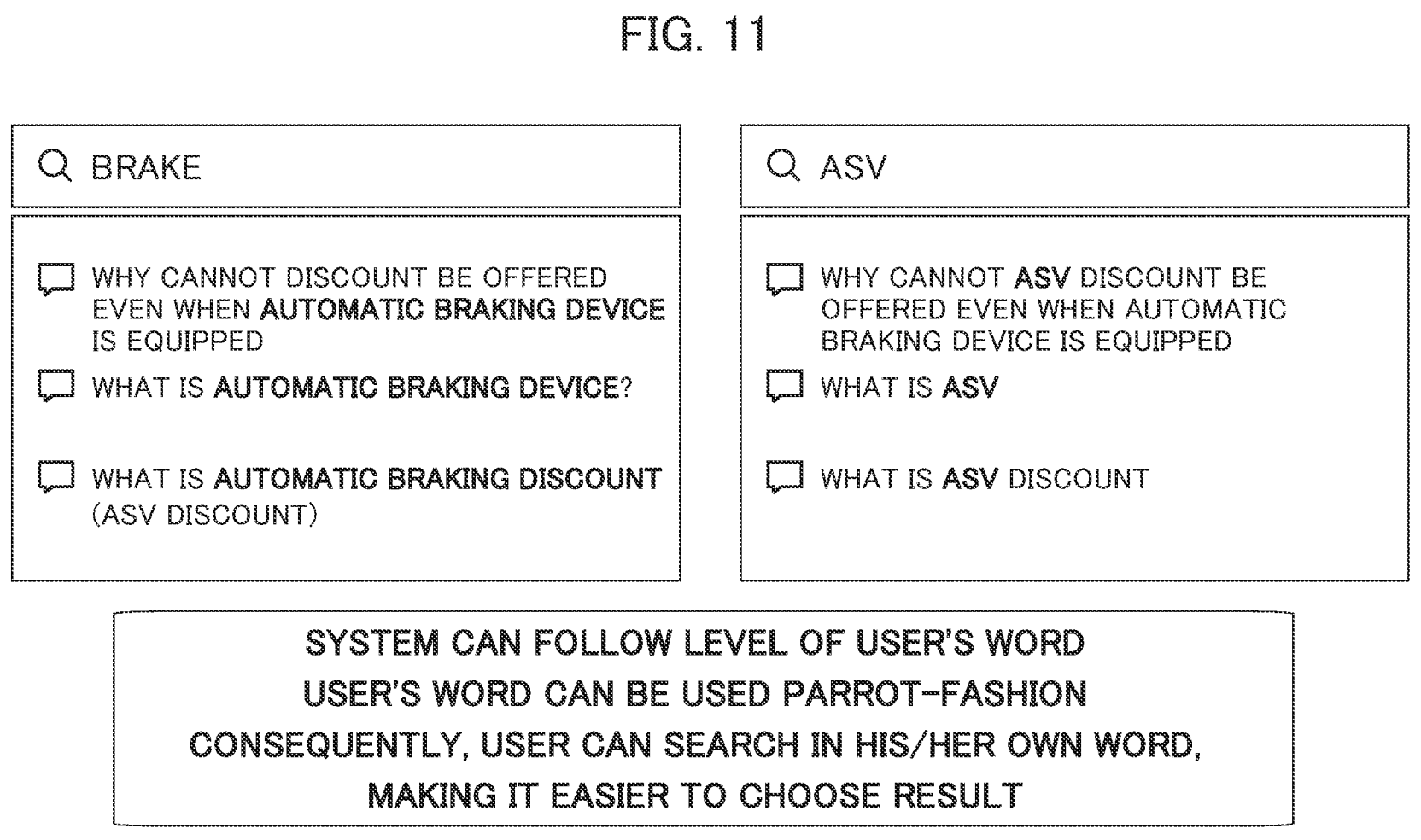

Q BRAKE

☐ WHY CANNOT DISCOUNT BE OFFERED
EVEN WHEN AUTOMATIC BRAKING DEVICE
IS EQUIPPED

☐ WHAT IS AUTOMATIC BRAKING DEVICE?

☐ WHAT IS AUTOMATIC BRAKING DISCOUNT
(ASV DISCOUNT)

Q ASV

☐ WHY CANNOT ASV DISCOUNT BE
OFFERED EVEN WHEN AUTOMATIC
BRAKING DEVICE IS EQUIPPED

☐ WHAT IS ASV

☐ WHAT IS ASV DISCOUNT

SYSTEM CAN FOLLOW LEVEL OF USER'S WORD
USER'S WORD CAN BE USED PARROT-FASHION
CONSEQUENTLY, USER CAN SEARCH IN HIS/HER OWN WORD,
MAKING IT EASIER TO CHOOSE RESULT

FIG. 12

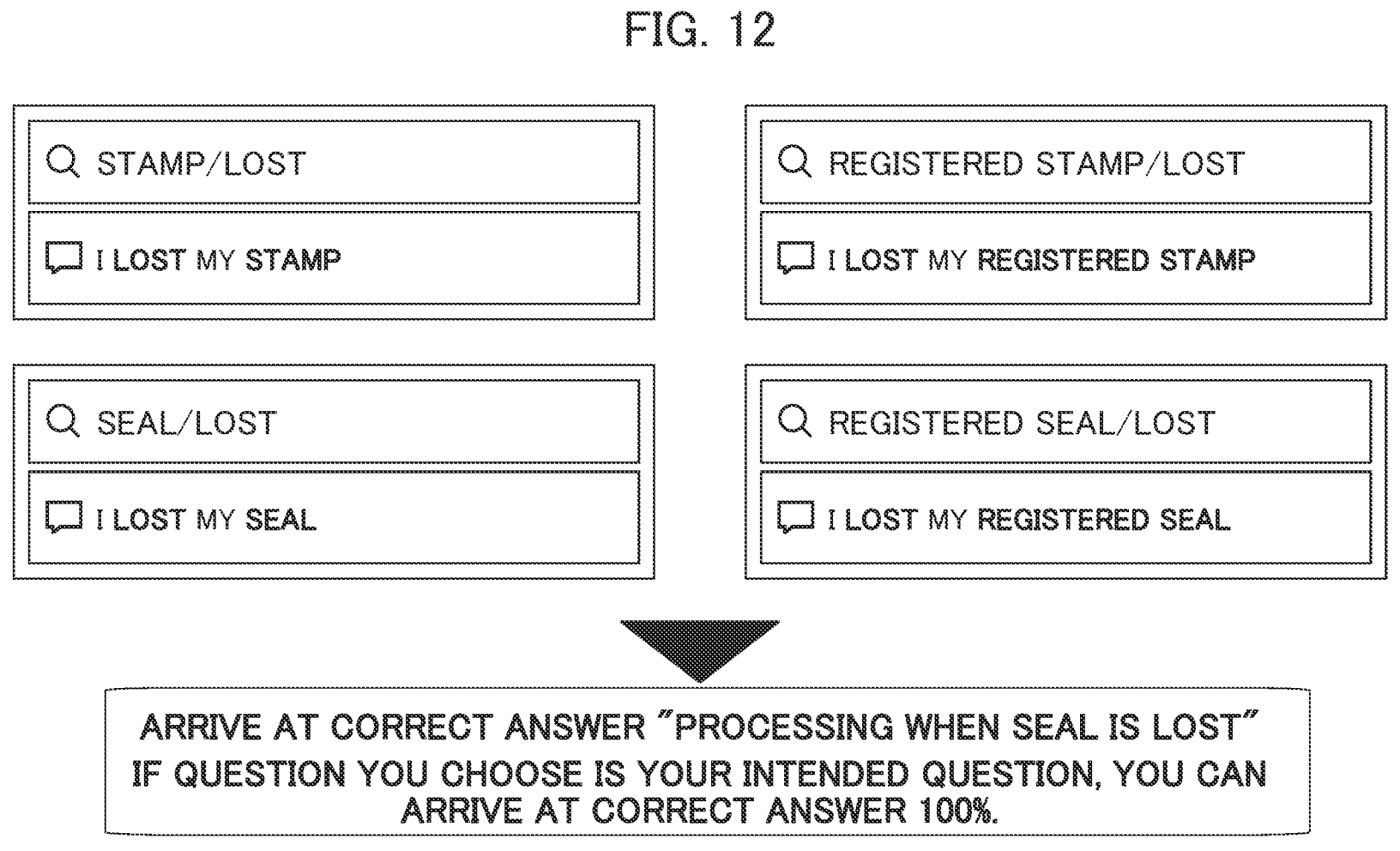

Q STAMP/LOST

☐ I LOST MY STAMP

Q SEAL/LOST

☐ I LOST MY SEAL

Q REGISTERED STAMP/LOST

☐ I LOST MY REGISTERED STAMP

Q REGISTERED SEAL/LOST

☐ I LOST MY REGISTERED SEAL

ARRIVE AT CORRECT ANSWER "PROCESSING WHEN SEAL IS LOST" IF QUESTION YOU CHOOSE IS YOUR INTENDED QUESTION, YOU CAN ARRIVE AT CORRECT ANSWER 100%.

FIG. 13

INFORMATION PROCESSING DEVICE, INFORMATION PROCESSING METHOD, AND PROGRAM

RELATED APPLICATION INFORMATION

This patent claims priority from International PCT Patent Application No. PCT/JP2021/045154, filed Dec. 8, 2021 entitled, "INFORMATION PROCESSING DEVICE, INFORMATION PROCESSING METHOD, AND PROGRAM", which claims priority to Japanese Patent Application Nos. 2020-203632 and 2020-203633, filed Dec. 8, 2020, all of which are incorporated herein by reference in their entirety.

NOTICE OF COPYRIGHTS AND TRADE DRESS

FIELD

The present invention relates to an information processing device, an information processing method, and a program.

BACKGROUND

As an accessorial service for supporting users who receive products or services, there is a technique related to a so-called FAQ search service capable of searching for information on combinations of typical questions and answers (for example, Patent Document 1, Japanese Unexamined Patent Application, Publication No. 2015-056014).

SUMMARY OF THE INVENTION

Problems to be Solved by the Invention

However, according to the conventional FAQ search service including the technique disclosed in Patent Document 1, even when a general user executes a search using keywords that come to mind, desired search results are often not hit. Further, it is often a case of not finding desired information due to too many hits. Specifically, for example, in a case of an FAQ search service for insurance products, when a search is executed using a keyword "renewal", a huge amount of search results will be displayed, resulting in making it difficult to find desired information.

The present invention has been made in view of such circumstances, and an object of the present invention is to enable a user to easily find a desired goal sentence or similar.

Means for Solving the Problems

In order to achieve the above object, an aspect of the present invention is to provide an information processing device including:

a receiving unit that uses, as a goal sentence or similar, a predetermined word, phrase, or sentence presented to a user in order to achieve a predetermined purpose of the user and receives a word related to the goal sentence or similar;

an extraction unit that extracts one or more guidance sentence candidates containing the word or a similar word as at least a part, from a guidance sentence dictionary in which a plurality of guidance sentence candidates intended by the user to reach the goal sentence or similar are associated with the goal sentence or similar and are registered in advance;

a first presentation unit that presents the one or more guidance sentence candidates themselves extracted by the extraction unit or a guidance sentence candidate processed based thereon to the user; and a second presentation unit that extracts, from the guidance sentence dictionary, the guidance sentence candidate itself selected by the user from the one or more guidance sentence candidates presented to the user by the first presentation unit or the goal sentence or similar associated with a processing source thereof and presents the extracted guidance sentence candidate itself or goal sentence or similar to the user.

An information processing method and a program according to aspects of the present invention are a method and a program corresponding to the information processing device according to the present invention.

Effects of the Invention

According to the present invention, it is possible for a user to easily find a desired goal sentence or similar.

DESCRIPTION OF THE DRAWINGS

FIG. 2A is a diagram showing an overview of the present service that can be realized by an information processing system to which a server according to an embodiment of the present invention is applied;

FIG. 2B is a diagram showing an overview of the present service that can be realized by an information processing system to which a server according to an embodiment of the present invention is applied;

FIG. 3 is a diagram showing an overview of the present service that can be realized by an information processing system to which a server according to an embodiment of the present invention is applied;

FIG. 7 is a diagram showing an example of a search on an FAQ search site of a conventional approach;

FIG. 9 is a diagram showing an example of user guidance realized by the intention expansion of the present service;

FIG. 10 is a diagram showing an example of user guidance realized by intention prediction in the present service;

FIG. 11 is a diagram showing an example of presentation of question sentence candidates in the present service;

FIG. 12 is a diagram showing an example in which the user selects a question sentence candidate in the present service; and FIG. 13 is a functional block diagram showing an example of a functional configuration of the server shown in FIG. 5 for executing processing of searching and presenting goal sentences or similar to a user.

DETAILED DESCRIPTION—PREFERRED MODE FOR CARRYING OUT THE INVENTION

Description of Apparatus

Figure 1A:
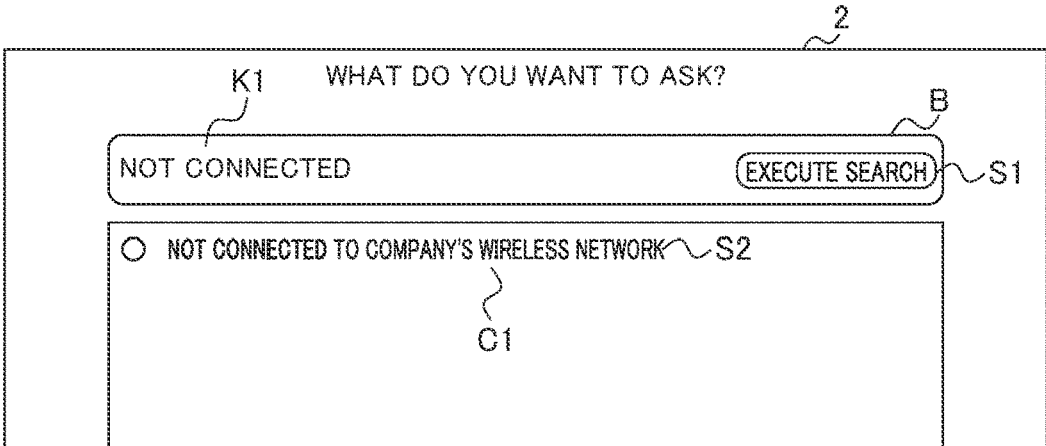
FIG. 1A is a diagram showing an overview of a present service that can be realized by an information processing system to which a server according to an embodiment of the present invention is applied.

An embodiment of the present invention will be described below with reference to the drawings.

First, referring to FIGS. 1 to 3, a description will be given with respect to an overview of a service (hereinafter, referred to as the "present service") that can be realized by an information processing system (see FIG. 3 to be described below) to which a server 1 according to an embodiment of the present invention is applied.

FIGS. 1 to 3 are diagrams showing an overview of the present service that can be realized by an information processing system to which a server according to an embodiment of the present invention is applied.

The present service is to use, as a goal sentence or similar, a predetermined word, phrase, or sentence presented to a user to achieve a predetermined purpose, and to help the user to reach the goal sentence or similar more easily. The goal sentences or similar may be any contents as long as they are presented to the user in order to achieve the predetermined purpose of the user, but the goal sentences or similar will be assumed as FAQs and answer sentences (articles) thereto in the following description. Further, such goal sentences or similar are called related sentences or similar W as appropriate. In other words, the present service will be described as a service that provides a search function or the like of a FAQ search site.

The present service is a service provided to a user (not shown) from a service provider (not shown). The user is a person who uses the present service. The user operates an information processing device 2 (hereinafter, referred to as a "user terminal 2") such as a smartphone, and accesses a FAQ search website (hereinafter, referred to as a "present FAQ search site") provided by the present service. Then, the user inputs a predetermined keyword K into a search box B provided in a part of the present FAQ search site to execute a search (step S1).

In the present FAQ search site, even when the keyword K input into the search box B is high in degree of generality, the user can find a desired sentence on an FAQ screen. Here, the "degree of generality" of the keyword K is an index indicating a range of meanings that can be recalled from the keyword K itself. The keyword K with a high degree of generality has a wide range of meaning that can be recalled from itself, and the keyword K with a low degree of generality has a narrow range of meaning that can be recalled from itself.

As a specific case, for example, it is assumed that there are problems that a worker does overtime through midnight hours and an in-house terminal of the user who is left alone in the company cannot connect to the Internet. In such a case, the user operates his/her smartphone (user terminal 2) to access the present FAQ search site. Then, the user inputs a conceivable keyword K into the search box B and executes a search in order to quickly find the FAQ for solving the problems.

For example, it is assumed that the user inputs a keyword K1 "not connected" into the search box B and executes a search. From the keyword K1 "not connected", the user can recall a state in which something supposed to be connected in some way is not connected. However, with only the keyword K1 "not connected", the user cannot specifically recall what is not connected to what in a certain form. In other words, it can be said that the keyword K1 "not connected" is high in degree of generality.

Here, it is assumed that the user uses the conventional FAQ search service to search for the keyword K1 "not connected". In this case, among FAQ sentences to be searched, a large number of sentences containing the keyword K1 "not connected" as a part are displayed as a search result. However, since the search result includes many FAQs not related to the Internet connection, it is difficult for the user to find a desired FAQ.

In addition, for example, it is assumed that the user inputs a keyword K2 "Internet" into the search box B and executes a search. From the keyword K2 "Internet", the concept of the so-called Internet can be recalled. However, with only the keyword K2 "Internet", it is not possible to recall specific contents of what happened to the Internet. In other words, it can be said that the keyword K2 "Internet" is high in degree of generality. Here, it is assumed that the user uses the conventional FAQ search service to search for the keyword K2 "Internet". In this case, among FAQ sentences to be searched, a large number of sentences including partially the keyword K2 "Internet" are displayed as a search result. However, since the search result includes many FAQs not related to the Internet connection, it is difficult for the user to find a desired FAQ.

In contrast, in a case of using the present FAQ search site, when a keyword K with the high degree of generality is input into the search box B, first, one or more candidates C for question sentences containing the keyword K as at least a part (hereinafter, referred to as "question sentence candidates C") are displayed (step S2). A plurality of question sentence candidates C are generated in advance and are stored and managed in a predetermined database (for example, a question sentence dictionary DB 181 in FIG. 5 to be described below) in a manner that can be searched and extracted.

Figure 1B:
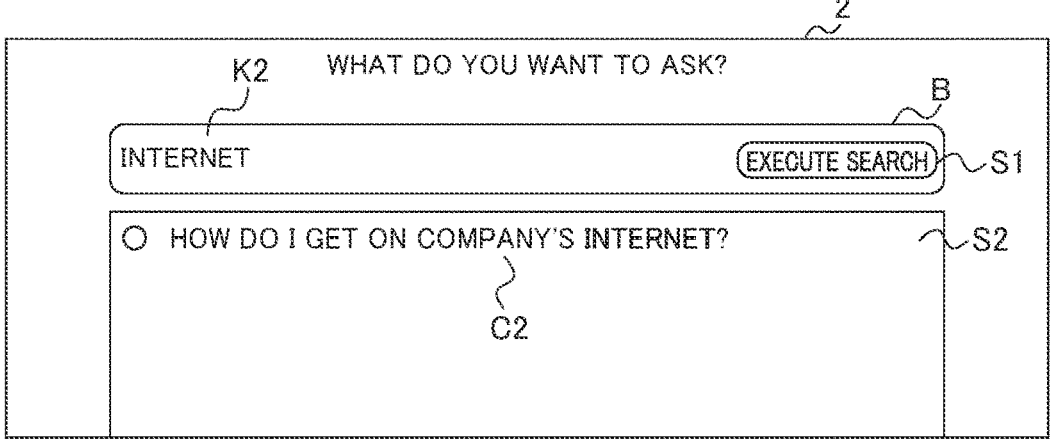
FIG. 1B is a diagram showing an overview of the present service that can be realized by an information processing system to which a server according to an embodiment of the present invention is applied.

Specifically, for example, as shown in FIG. 1A, when the keyword K1 "not connected" is input into the search box B, a question sentence candidate C1 "not connected to a company's wireless network" is displayed. Further, for example, as shown in FIG. 1B, when the keyword K2 "Internet" is input into the search box B, a question sentence candidate C2 "How do I get on the company's Internet" is displayed. Although only one question sentence candidate C (question sentence candidate C1 or C2) is displayed in the example of FIG. 1, two or more question sentence candidates C may be displayed.

Figure 1C:
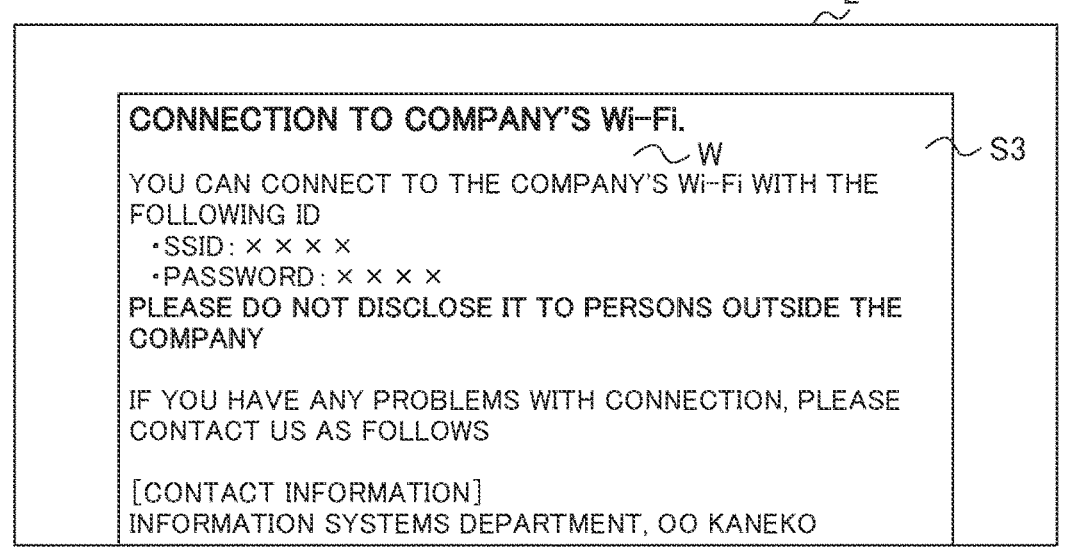
FIG. 1C is a diagram showing an overview of the present service that can be realized by an information processing system to which a server according to an embodiment of the present invention is applied.

When a question sentence candidate C desired by the user is selected from the one or more question sentence candidates C which have been displayed, the screen transitions. Then, as shown in FIG. 1C, one or more predetermined words, phrases, or sentences W having a predetermined relatedness with the keyword K (hereinafter, referred to as "related sentence or similar W") are displayed (step S3). There is no particular limitation on how to define the "relatedness" in the present service, and the service provider can define the relatedness arbitrarily. Then, the keyword K, the question sentence candidate C, and the related sentences or similar W of which the relatedness is recognized by the service provider are associated with each other, whereby a question sentence dictionary is generated. In other words, the related sentences or similar W managed in association with the keyword K in the question sentence dictionary are treated as having "relatedness" to the keyword K. The question sentence dictionary is stored and managed in a predetermined database (for example, a question sentence dictionary DB 181 in FIG. 5 to be described below) in a manner that can be searched and extracted.

Specifically, for example, as shown in FIG. 1A, when the question sentence candidate C1 "not connected to the company's wireless network" is selected, documents on the FAQ screen related to the keyword K1 "not connected" are displayed as related sentences or similar W. In other words, as shown in FIG. 1C, documents on the FAQ screen are displayed as related sentences or similar W "you can connect to the company's Wi-Fi network with the following ID connectable to the company's Wi-Fi. SSID: XXXX Password: XXXX, Please do not disclose it to persons outside the company. If you have any problems with the connection, please contact us as follows. [Contact information] Information Systems Department, OO Kaneko". Thus, the user can quickly solve the problem of not being connected to the Internet with reference to the sentences displayed on the FAQ screen.

Further, for example, as shown in FIG. 1B, when the question sentence candidate C2 "How do I get on the company's Internet" is selected, documents on the FAQ screen related to the keyword K2 "Internet" are displayed as related sentences or similar W. In other words, as shown in FIG. 1C, sentences on the FAQ screen are displayed as related sentences or similar W "you can connect to the company's Wi-Fi network with the following ID connectable to the company's Wi-Fi. SSID: XXXX Password: XXXX, Please do not disclose it to persons outside the company. If you have any problems with the connection, please contact us as follows. [Contact information] Information Systems Department, CC Kaneko". Thus, the user can quickly solve the problem of not being connected to the Internet with reference to the sentences displayed on the FAQ screen.

In the present service, as described above, when the keyword K is input into the search box B, one or more question sentence candidates C containing the keyword K as at least a part are displayed. Then, when one question sentence candidate C is selected, the sentences on the FAQ screen related to the keyword K are displayed as related sentences or similar W. Thus, the user can easily find a desired sentence on the FAQ screen.

There are two special mentions here. A first special mention is that the sentences displayed on the FAQ screen as the related sentences or similar W does not contain the keyword K. In other words, the user can easily find a desired FAQ by simply performing a simple operation of inputting a keyword K with the high degree of generality that easily comes to mind into the search box B and selecting a displayed question sentence candidate C.

In addition, a second special mention is that even when different keywords K are input into the search box B, the same desired related sentences or similar W can be found. In other words, a plurality of question sentence candidates are associated with one FAQ, and different keywords K are associated with the plurality of question sentences, respectively. In other words, when the user wants to display a desired sentence on the FAQ screen, the user only needs to input a keyword K with a high degree of generality that comes to mind on the spur of the moment and select the displayed question sentence candidate C. In other words, when the problem "cannot connect to the Internet" occurs as in the examples of FIGS. 1A and 1B described above, it is sufficient to input the keyword K with a high degree of generality such as "not connected" or "Internet".

Further, on the present FAQ search site provided by the present service, it is possible to display a person concerned with the related sentences or similar W and an organization to which the person concerned belongs. Specifically, for example, as shown in FIG. 1C, in a display region F1 below the sentences (related sentences or similar W) on the FAQ screen, the person concerned (OO Kaneko) and the organization (information systems department) to which the person concerned belongs are noted as [Contact information]. In addition, each of the notation of the person concerned and the notation of the organization to which the person concerned belongs is displayed in the form of a button that allows access to a predetermined web page on which detailed information is posted. For this reason, for example, when the display of the person concerned (OO Kaneko) is pressed (for example, tapped), a predetermined web page (hereinafter, referred to as a "detailed page") is displayed on which detailed information (for example, department, telephone number, and email address) is posted as shown in FIG. 2A. Further, for example, as shown in FIG. 2B, a predetermined web page related to the detailed page (hereinafter, referred to as a "related page") is displayed. Thus, when the problem cannot be solved only by the sentences on the FAQ screen, the user can quickly identify the person in charge and make an inquiry, thereby the problem can be solved early.

In the present service, as described above, the question sentence dictionary is managed in a predetermined database. Thus, when the question sentence candidate C is selected, the related sentences or similar W can be displayed in the manner as shown in FIG. 1 described above, but the related sentences or similar W can also be displayed in a manner as shown in FIG. 3, for example.

In other words, when the keyword K is input into the search box B (step S11), one or more question sentence candidates C are displayed in a display region Flt below (step S12). The above-described case is the same as the example of FIG. 1, but a list of related sentences or similar W is displayed under a display region F12 (step S13). Specifically, a list of related sentences or similar W as shown in FIG. 3 is displayed as "word hints". One or more related sentences or similar W listed as "word hints" are displayed in the order of A to Z and in the order of the Japanese syllabary. Further, one or more related sentences or similar W listed as "word hints" are listed in an orderly manner in a manner similar to each other without any particular differentiation in a state where no keyword K is input into the search box B. However, when the keyword K is input into the search box B, "word hints" (related sentences or similar W) corresponding to the keyword K are highlighted. Specifically, for example, as shown in FIG. 3, it is assumed that a keyword K "address" is input. Then, among one or more "word hints" (related sentences or similar W) displayed in the display region F12, "purchase", "convenience store", "exhibition", "address", "anonymous", "change", and "returning goods" corresponding to the "address" are highlighted (displayed in bold in the example of FIG. 3) as "word hints" (related sentences or similar W). The user performs an operation (for example, a tapping operation) to select a desired "word hint" (related sentences or similar W) from the one or more highlighted "word hints" (related sentences or similar W). Then, although not shown, the sentences on the FAQ screen desired by the user are displayed as related sentences or similar W.

In the present service, the present FAQ search site is improved as appropriate. In the present service, as described above, the keyword K, the question sentence candidate C, and the related sentences or similar W are associated with each other, and are managed as a question sentence dictionary. Further, a user's operation history is also managed as history information. In other words, in the present service, the keyword K input into the search box B by the user, the question sentence candidate C selected by the user, and the related sentences or similar W found by the user are managed as history information. The history information includes information on question sentence candidates C which are not selected by the user even when the question sentence candidates C are displayed by the input of the keyword K into the search box B. In addition, the history information includes information on sentences on the FAQ screen not desired by the user even when the sentences on an FAQ screen (related sentences or similar W) are displayed by the selection of the question sentence candidate C. Specifically, for example, it is assumed that the present FAQ search site has been employed for a certain EC (Electronic Commerce) site. Then, it is assumed that many users input the name of a specific payment option into the search box B. In this case, although one or more question sentence candidates C are displayed on the user terminals 2 of many users, many users may not select the question sentence candidate C. Further, there is a case where even one question sentence candidate C is not displayed. In such a case, since it is possible to guess the question sentence candidate C that many users are expected to desire, a new question sentence candidate C is prepared based on the result of the guess. Thus, the present FAQ search site can be fully improved. As a result, it is possible to improve the satisfaction of users who use the present FAQ search site. Further, when the user does not select to reach the keyword K or the related sentences or similar W contained in the question sentence candidate C that is not selected by the user, since products and services can be determined that are desired by the user but are not provided, it is possible to contribute to creation of new products and services desired by the user.

Figure 4:
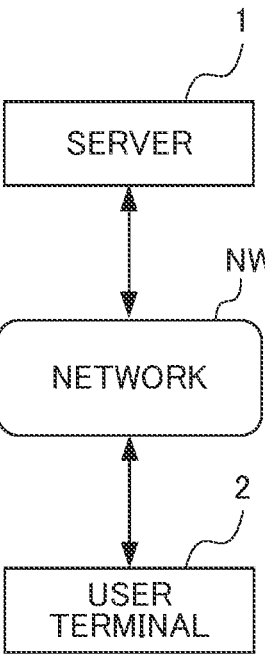
FIG. 4 is a diagram showing an example of a configuration of an information processing system to which a server according to an embodiment of the information processing device of the present invention is applied.

Next, a description will be made with reference to FIG. 4 with respect to a configuration of an information processing system that realizes the provision of the above-described present service, that is, a configuration of an information processing system to which the server 1 according to an embodiment of the information processing device of the present invention is applied. FIG. 4 is a diagram showing an example of a configuration of an information processing system to which the server according to an embodiment of the information processing device of the present invention is applied.

The information processing system shown in FIG. 4 includes a server 1 and a user terminal 2. The server 1 and the user terminal 2 are connected to each other via a predetermined network NW such as the Internet.

The server 1 is an information processing device managed by the service provider. The server 1 executes various types of processing for realizing the present service while appropriately communicating with the user terminal 2.

The user terminal 2 is an information processing device operated by the user. The user terminal 2 is configured by a smartphone, a tablet, a personal computer, or the like as described above.

Figure 5:
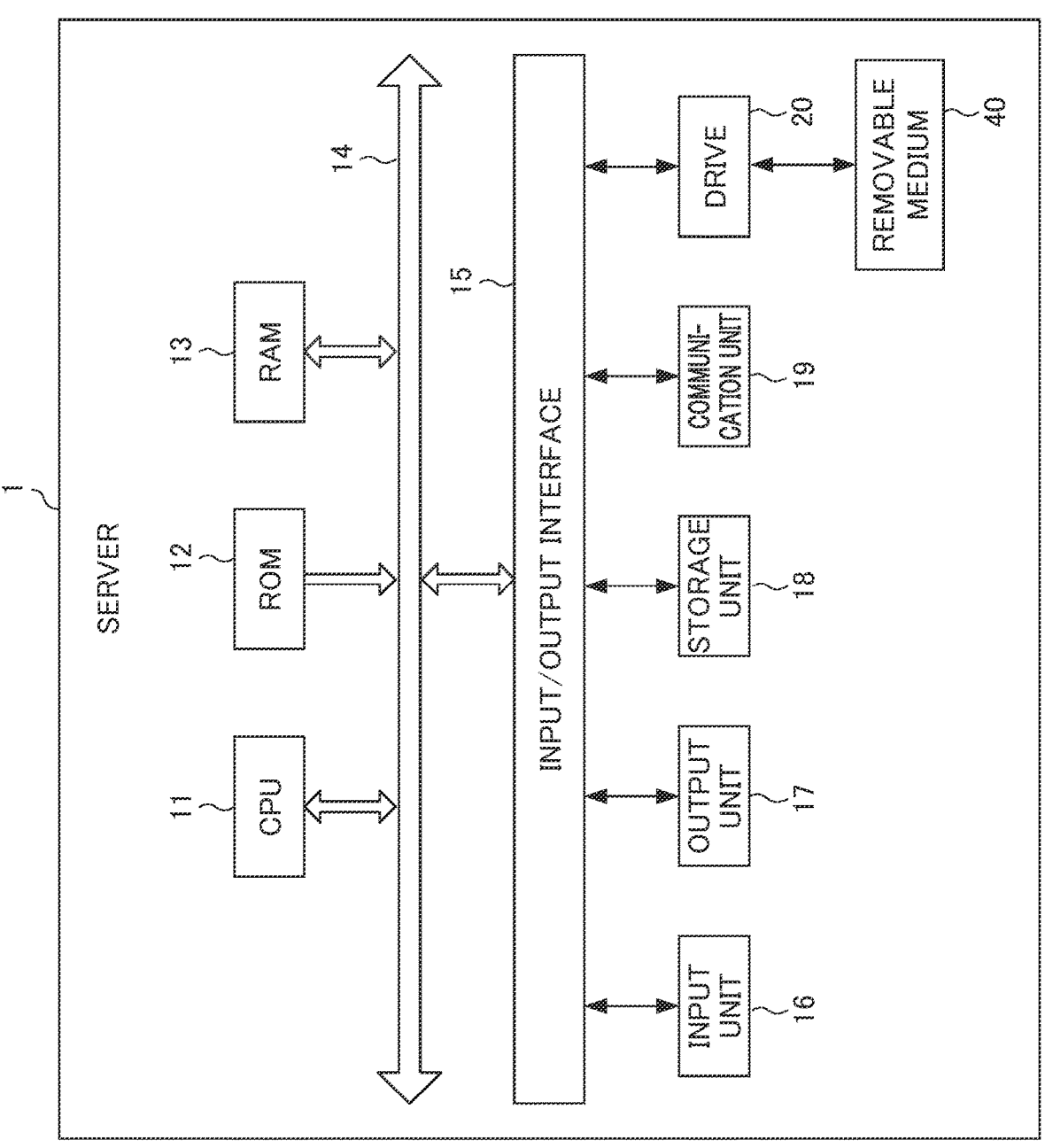
FIG. 5 is a block diagram showing an example of a hardware configuration of the server in the information processing system shown in FIG. 4.

FIG. 5 is a block diagram showing an example of a hardware configuration of the server in the information processing system shown in FIG. 4.

The server 1 includes a CPU (Central Processing Unit) 11, a ROM (Read Only Memory) 12, a RAM (Random Access Memory) 13, a bus 14, an input/output interface 15, an input unit 16, an output unit 17, a storage unit 18, a communication unit 19, and a drive 20.

The CPU 11 executes various types of processing according to programs recorded in the ROM 12 or programs loaded from the storage unit 18 to the RAM 13. The RAM 13 also appropriately stores data or the like necessary for the CPU 11 to execute various types of processing.

The CPU 11, the ROM 12, and the RAM 13 are connected to each other via the bus 14. The bus 14 is also connected with the input/output interface 15. The input/output interface 15 is connected with the input unit 16, the output unit 17, the storage unit 18, the communication unit 19, and the drive 20.

The input unit 16 is configured by, for example, a keyboard and the like, and inputs various information. The output unit 17 is configured by, for example, a display such as a liquid crystal, a speaker, and the like and outputs various information as an image or a sound. The storage unit 18 is configured by, for example, a DRAM (Dynamic Random Access Memory), and stores various data. The communication unit 19 communicates with other devices (for example, the user terminal 2 in FIG. 4) via the network NW including the Internet.

The drive 20 is appropriately equipped with a removable medium 40 such as a magnetic disk, an optical disk, a magneto-optical disk, or a semiconductor memory. A program read from the removable medium 40 by the drive 20 is installed in the storage unit 18 as necessary. In addition, the removable medium 40 can also store various data stored in the storage unit 18 in the same manner as the storage unit 18.

Although not shown, the user terminal 2 in FIG. 4 have basically the same hardware configuration as that shown in FIG. 5. Therefore, the hardware configuration of the user terminal 2 will not be described.

Various types of processing including question sentence dictionary generation processing and related sentences or similar extraction processing can be executed by cooperation of various types of hardware and software constituting the information processing system of FIG. 4 including the server 1 of FIG. 5. As a result, the service provider can provide the above-described present service to the user. The "question sentence dictionary generation processing" refers to processing for generating the above-described question sentence dictionary. The "related sentences or similar extraction processing" refers to processing for extracting the related sentences or similar W using the above-described question sentence dictionary. The "question sentence dictionary improvement processing" refers to processing for improving the above-described question sentence dictionary. Hereinafter, a description will be made with respect to a functional configuration for executing the question sentence dictionary generation processing, the related sentences or similar extraction processing, and the question sentence dictionary improvement processing executed in the server 1 of FIG. 5 constituting the information processing system of FIG. 4.

Figure 6:
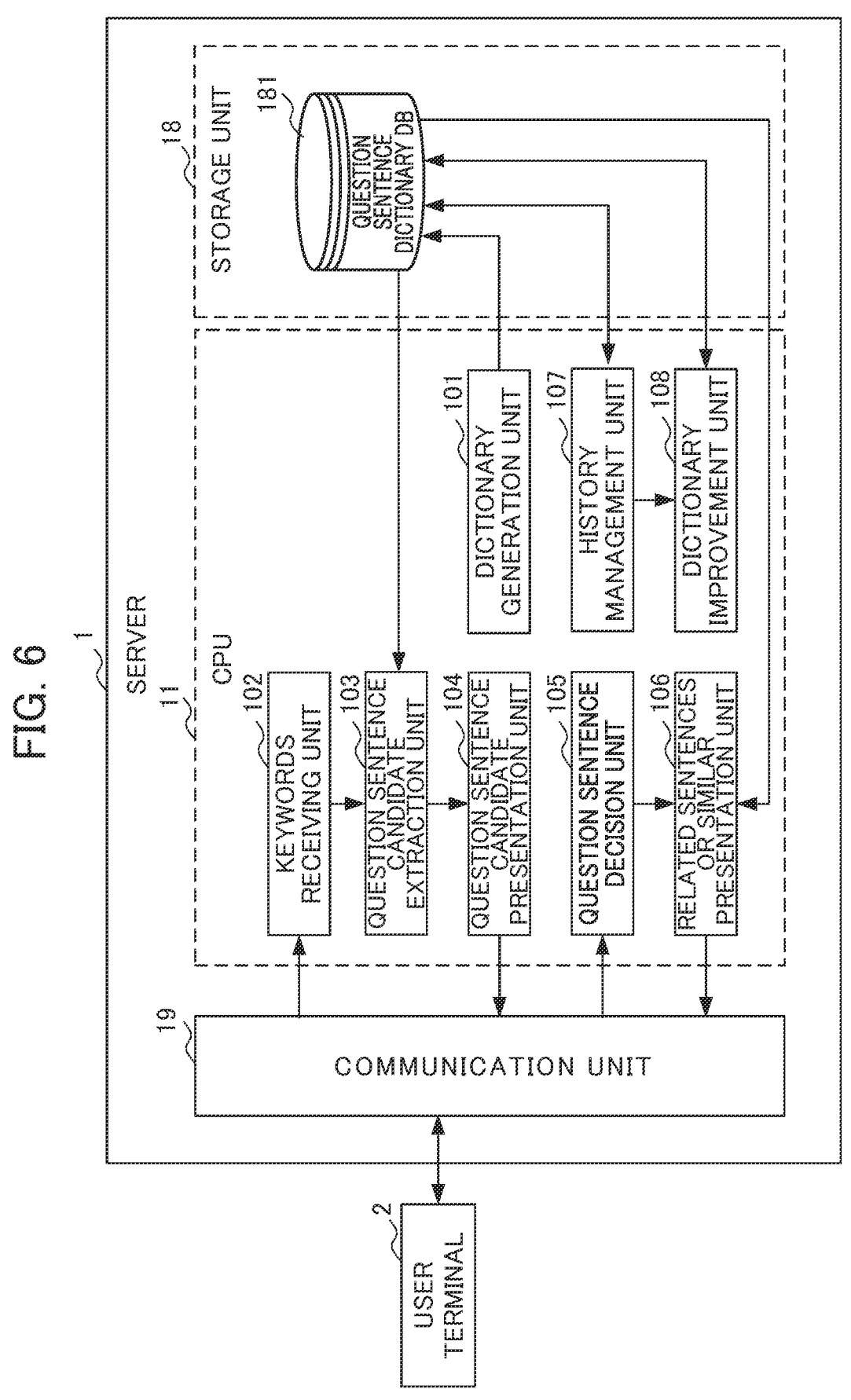
FIG. 6 is a functional block diagram showing an example of a functional configuration for executing question sentence dictionary generation processing, related sentences or similar extraction processing, and question sentence dictionary improvement processing, among the functional configuration of the server of FIG. 5 constituting the information processing system of FIG. 4.

FIG. 6 is a functional block diagram showing an example of a functional configuration for executing the question sentence dictionary generation processing, the related sentences or similar extraction processing, and the question sentence dictionary improvement processing, among the functional configuration of the server of FIG. 5 constituting the information processing system of FIG. 4.

As shown in FIG. 6, when the server 1 executes the question sentence dictionary generation processing, the CPU 11 functions as a dictionary generation unit 101. Further, when the server 1 executes the related sentences or similar extraction processing, the CPU 11 functions as a keyword receiving unit 102, a question sentence candidate extraction unit 103, a question sentence candidate presentation unit 104, a question sentence decision unit 105, and a related sentences or similar presentation unit 106. In addition, when the server 1 executes the question sentence dictionary improvement processing, the CPU 11 functions as a history management unit 107 and a dictionary improvement unit 108.

Further, a question sentence dictionary DB 181 is provided in one region of the storage unit 18 of the server 1. The question sentence dictionary DB 181 stores a question sentence dictionary.

The dictionary generation unit 101 stores the keyword K, the question sentence candidate C, and the related sentences or similar W in the question sentence dictionary of the question sentence dictionary DB 181 in association with each other so as to extract the question sentence candidate C including the keyword K, which is a word related to a total or constituent elements of the related sentences or similar W and has a higher degree of generality when the keyword K is input into the search box B. Thus, a question sentence dictionary is generated such that the user who searches for the FAQ can easily find desired information.

The keyword or the like receiving unit 102 receives the keyword K input into the search box B. Specifically, for example, when the keyword K "not connected" or "Internet" is input into the search box B in the example of FIG. 1 described above, the keyword or the like receiving unit 102 receives such a keyword.

The question sentence candidate extraction unit 103 extracts, from the question sentence dictionary of the question sentence dictionary DB 181, one or more question sentence candidates C containing the keyword K input into the search box B as at least a part.

The question sentence candidate presentation unit 104 presents one or more question sentence candidates C, which are extracted by the question sentence candidate extraction unit 103, to the user. Specifically, the question sentence candidate presentation unit 104 presents one or more question sentence candidates C, which are extracted by the question sentence candidate extraction unit 103, to the user by executing control to display them on the user terminal 2.

When one question sentence candidate C is selected from one or more question sentence candidates C presented to the user by the question sentence candidate presentation unit

104, the question sentence decision unit 105 decides the selected question sentence candidate as a question sentence desired from the user.

The related sentences or similar presentation unit 106 extracts the related sentences or similar W associated with the question sentence candidate C, which is decided as the question sentence desired from the user by the question sentence decision unit 105, and presents it to the user. Specifically, the related sentences presentation unit 106 extracts the sentences on the FAQ screen as the related sentences or similar W associated with the decided question sentence candidate C, and presents the extracted sentences to the user by executing control to display the extracted sentences on the user terminal 2. Thus, the user can quickly solve the problem by referring to the displayed sentences on the FAQ screen. In addition, the related sentences or similar presentation unit 106 further extracts, as related sentences or similar W, information on a person concerned with the previously extracted related sentences or similar W and an organization to which the person concerned belongs, and presents it to the user. Further, the related sentences or similar presentation unit 106 presents the related page and the detailed page to the user.

The history management unit 107 manages, as history information, the keyword K received by the keyword or the like receiving unit 102, the question sentence candidate C selected by the user from the one or more question sentence candidates C presented to the user by the question sentence candidate presentation unit 104, and the related sentences or similar W presented to the user by the related sentences or similar presentation unit 106 in response to the selection. Further, the history management unit 107 extracts the keyword K received by the keyword receiving unit 102, but the keyword K for which related sentences or similar W not selected by the user is not presented by the related sentences or similar presentation unit 106.

When the question sentence candidate is not decided by the question sentence decision unit 105 after being presented to the user by the question sentence candidate presentation unit 104 as history information by the history management unit 107, the dictionary improvement unit 108 improves the question sentence dictionary including an association relationship between the keyword K contained in the question sentence candidate C and the question sentence candidate C.

As described above, the information processing device of FIG. 5 has the above-described functional configuration shown in FIG. 6, and thus the user who uses the present FAQ search site can easily find a desired sentence on the FAQ screen. Further, since products and services can be determined that are desired by the user but are not provided, it is possible to contribute to creation of new products and services desired by the user.

Hereinafter, a description will be further made with respect to why the user using the present FAQ search site can easily find a desired sentence on the FAQ screen unlike the conventional FAQ search site. FIG. 7 is a diagram showing an example of a search on an FAQ search site of a conventional approach. In other words, according to the conventional approach, a character string input by the user himself/herself is received, and a list of hit pages is presented to the user, assuming that pages (articles) of FAQs and their answers containing the character string are hits. Then, the user needs to select the article that the user himself/herself wants to search from the list. However, there are usually many hits for articles that include the character string (search keywork) input by the user.

As a result, there is a case where a selection cannot be made because too many irrelevant answers are presented. In other words, there is a possibility that a correct answer (article to be presented to the user) exists somewhere in the list, but there is a case where the user himself/herself does not know to browse to the relevant article in the list. Therefore, the user needs to check the list in order from the top (from the beginning).

Further, as a result, nothing is being listed. In other words, articles containing the character string input by the user are listed. Therefore, when the character string input by the user is not a term or the like used in the article, nothing is listed, and the user has to reconsider and input another character string.

Assuming the conventional approach in which the articles containing the character string input by the user is listed as described above, the following countermeasure is conceivable. In other words, it is conceivable to prepare a large number of articles. Specifically, for example, by replacing a word with another word or preparing multiple patterns of articles with different views of the problem, it is possible to make the search hit no matter what character string is input by the user. However, with such a countermeasure, there is a demerit that although hits are obtained, irrelevant articles will be hit. Further, for example, a similar article (answer) may be hit multiple times, causing confusion. Further, maintainability will deteriorate.

In addition, for example, there is a method that employs an AI (Artificial Intelligence) for evaluating the relatedness between the character string input by the user and the article to be presented to the user, instead of creating a list on the condition that an article contains the character string input by the user. When machine-learning AI is employed, it will be less likely that there are no hit articles. However, this does not solve the problem that the list of hit articles contains many articles that are originally intended by the user. In addition, when AI is employed, articles being deemed highly relevant by AI are presented as a result, an answer with problems in terms of compliance and sales may be issued, and it is difficult to eliminate this with certainty. When the AI is employed, it is vulnerable to changes in service and business environment. In other words, since past search results are used for AI learning, it is difficult to counteract in a short period of time when there is an increase in specific inquiries, or when the service, business environment, or service itself changes. When the AI is employed, a large amount of data is required for individual tuning for each search target (for example, service). Further, cleansing of such a large amount of data requires many engineering resources, resulting in high costs.

In this way, the conventional approach and the method using AI are nothing but evaluation of the relationship between the character string input by the user and the article (including simply an evaluation of relationship whether to contain), and have the problems as described above. In contrast, unlike the above-described conventional FAQ search site, a description will be made below with respect to a case where the user who uses the present FAQ search site can easily find a desired FAQ and its answer article.

Figure 8:
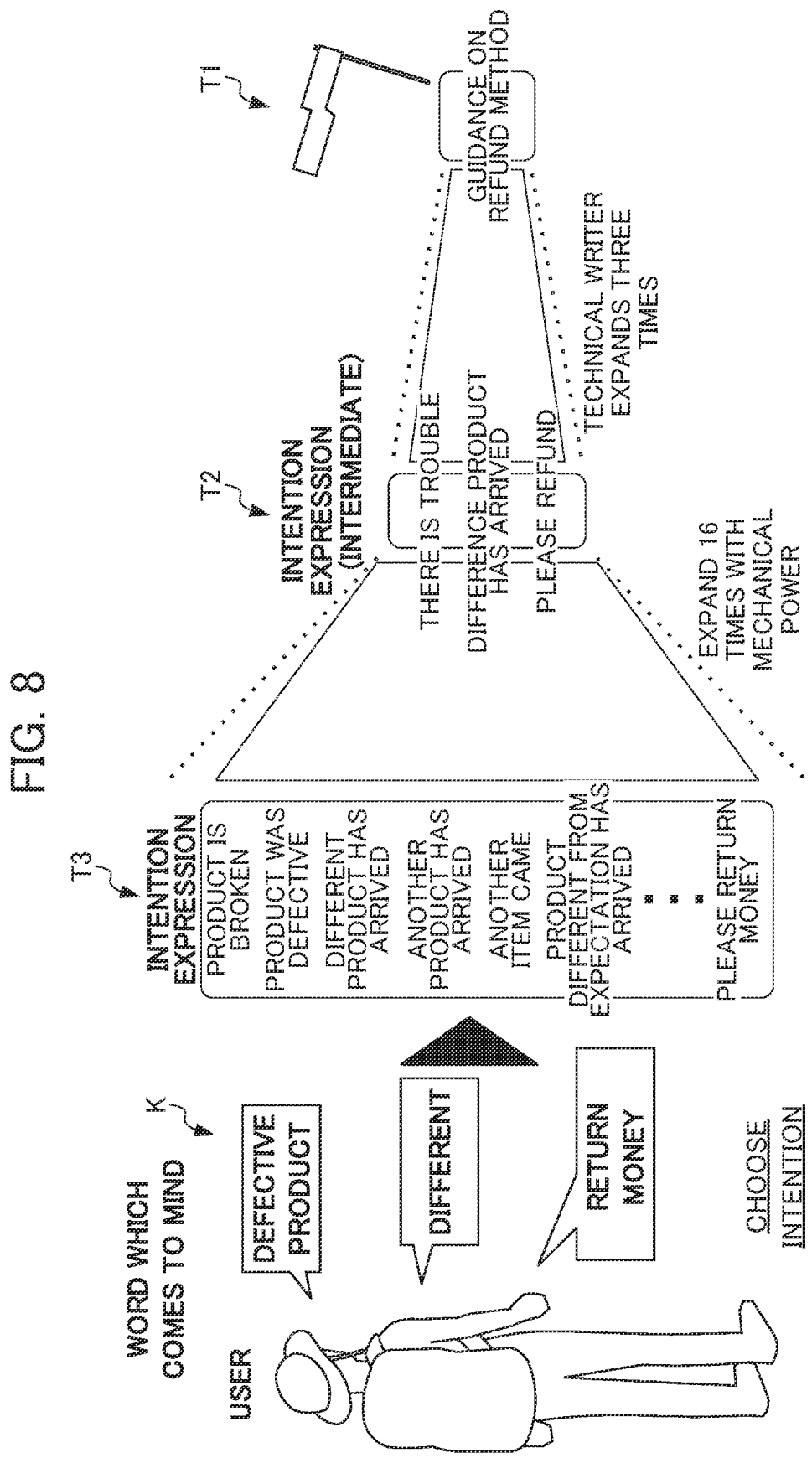
FIG. 8 is a diagram for explaining a concept of intention expansion in the present service.

FIG. 8 is a diagram explaining a concept of intention expansion in the present service. In an example of FIG. 8, a goal sentence or similar T1 to be presented to the user is an article of an FAQ "Guidance on refund method" and its answer. Here, it can be said that the article (goal sentence or similar) titled "Guidance on refund method" should be presented to users of mail-order sites or the like, that is, user who are "troubled by delivery of defective products", users who "received a product different from an ordered product", or users who wishes to "return the money" for some reason.

Therefore, in the present service, a technical writer expands the goal sentence or similar T1 to an intention expression (intermediate) T2 (expanding three times in the example of FIG. 8). In other words, the technical writer expands the sentence to an expression that considers what the user intends. In the example of FIG. 8, in other words, for example, the technical writer assumes that the user intends to obtain an answer by telling a fact that "there is a trouble with the product", and performs expansion. Further, for example, the technical writer assumes that the user intends to obtain an answer by telling a fact that "a difference product has arrived", and performs expansion. Further, for example, the technical writer assumes that the user intends to obtain an answer by telling a desire (solution method) that "I want to a refund", and performs expansion. In this way, the technical writer expands from the goal sentence or similar T1 to the intention expression (intermediate) T2 from the viewpoint that the article should be presented to the user having any intention.

Then, the server 1 further expands the intention expression (intermediate) T2. In other words, the server 1 expands the intention expression (intermediate) T2 to an intention expression T3 using a predetermined algorithm (expanding 16 times in the example of FIG. 8). Specifically, for example, as shown in FIG. 8, the intention expression (intermediate) T2 "there is trouble" expands into "the product is broken", "the product is defective", and the like. In other words, for example, the server 1 expands by supplementing the subject, replacing words with synonyms or the like, and changing combinations of word endings or auxiliary verbs or the like so as to form synonymous sentences. The intention expression T3 generated (expanded) in this way is stored as a question sentence candidate C in the question sentence dictionary DB 181 described above. Similarly, each of a plurality of goal sentences or similar T1 is expanded through stages of the intention expression (intermediate) T2 and the intention expression T3, and then is stored as a question sentence candidate C in the question sentence dictionary DB 181 described above.

As a result, the user can perform the following search. FIG. 9 is a diagram showing an example of user guidance realized by the intention expansion of the present service. In other words, for example, as shown in FIG. 9, the user can perform a search by inputting a word (keyword K) that comes to mind with an intention such as "defect", "different", or "refund". In other words, since a plurality of questions (intention expressions) are generated for a "certain article" (goal sentence or similar T1), the user can find the article from various phrases. In the present service, as shown in FIGS. 8 and 9, even when the keywords K input by the user are different (for example, "defective product" and "defect", "different" and "difference", "return the money" and "refund"), a question sentence candidate C appropriate to the user is presented to the user. This will be described below with reference to FIGS. 11 and 12.

The intention expansion, which is one of the differences in the present service from the conventional FAQ search site, has been described above. Other functions or the like of the present service will be described below that improve the convenience of the user.

FIG. 10 is a diagram showing an example of user guidance realized by intention prediction in the present service. As shown in FIG. 10, the server 1 of the present service has a function of predicting the user's intention from only one character input by the user. Thus, the user can confirm the question sentence candidate C without inputting all the question sentences (keywords K). In other words, the present service has a prediction function of predicting what keyword K the user will finally input from the character input at the time of inputting the keyword K from the user. The prediction function is adjusted for each service to be searched in the present service (for example, a service targeted by the FAQ search site). In other words, for example, in a case of an FAQ search site of a service using the term "point", if the user inputs "po", it is predicted that the keyword K "point" will be input. Further, for example, in a case of an FAQ search site of a service using a "portfolio", if the user inputs "po", it is predicted that the keyword K "portfolio" will be input.

Note that, even when the prediction function functions, the question sentence candidate C containing the keyword K is presented to the user as described above. In other words, at the point when the user inputs the keyword K "point", even if the user is a natural person, it is usually not possible to grasp the intention of the user as to whether the user wants to do with the point or the like. However, in the present service, since the question sentence candidate C containing the keyword K is presented to the user, the user can always reach the answer by selecting the question sentence candidate C that matches his/her intention.

In the following, a supplementary description will be given with respect to a feature that the question sentence candidate C containing the keyword K input by the user is presented to the user. FIG. 11 is a diagram showing an example of presentation of question sentence candidates in the present service. As shown in FIG. 11, when a keyword K is input by the user, a question sentence candidate C containing the keyword K is presented to the user. Then, the user can confirm a goal sentence or similar T1 by selecting a question sentence candidate C, which matches his/her intention, from the presented question sentence candidate C. The server 1 stores and manages definitions of terms, explanations, synonyms, and paraphrases as a definition database in association with each other. Specifically, for example, in the example of FIG. 11, "automatic braking device" and "ASV" are stored as a definition database in association with each other. Then, when searching for the question sentence candidate C based on the keyword K input by the user, the server 1 searches for the question sentence candidate C using the definition database and presents it to the user. Thus, an intention expansion T3 "what is the automatic braking device" is hit. Here, when the user searches using the keyword K "ASV", the word "ASV" is substituted for "automatic braking device" in the intention expansion T3 "what is the automatic braking device", and is presented to the user as a question sentence candidate C. Thus, since the user's words are "always" contained in the question, the question sentence candidate C not depending on the user's search level is presented to the user. In other words, the system (server 1) can present the question sentence candidate C according to the level of the user's word. From the user's point of view, the user can search in his/her own words, and can easily select from a plurality of question sentence candidates. In other words, since the question sentence candidate C expressed using the keyword K input by the user is presented only by inputting the keyword K, the user can easily select from a plurality of question sentence candidates.

FIG. 12 is a diagram showing an example in which the user selects a question sentence candidate in the present service. As shown in FIG. 12, the user is presented with a question sentence candidate C containing a keyword K input by the user. Thus, as described with reference to FIG. 11, the user can search in his/her own words. Then, as a result of selecting the question sentence candidate C containing the keyword K input by the his or her own, the user can reach the goal sentence or similar T1 corresponding to the question. The description has been further made above with respect to why the user using the present FAQ search site can easily find a desired sentence on the FAQ screen, unlike the above-described conventional FAQ search site.

The goal sentences or similar T1 are FAQs and their answer sentences (articles) in the above description, but the present service can be applied to a predetermined word, phrase, or sentence that is presented to the user in order to achieve the user's predetermined purpose, as described above.

In other words, for example, the goal sentence or similar T1 may be an explanatory sentence of a product (service). Specifically, for example, it is assumed that the user has an intention of "I am worried about my child's education fund" on the premise of financial services. In this case, the user inputs a keyword "children" into an input field displayed together with a sentence "What do you want to ask?" displayed on a financial service site. As a result, the user is presented with question sentence candidates C, for example, "I want to prepare funds for my child's education", "Are up to what age children eligible for OO" and the like. Here, "OO" is the name of a service for preparing funds for a child's education, that is, a so-called educational endowment insurance service. Next, the user can browse a page for product description of "OO" of the educational endowment insurance by selecting a question sentence candidate C "I want to prepare funds for my child's education", which has not yet been verbalized and input as a keyword K.

Note that the keyword K and the question sentence candidate C described above also function appropriately for a user who intends to use the service of OO and who has the intention of "I would like to know up to what age children are eligible". Further, as described above, when a product introduction is employed for the goal sentence or similar T1 in the present service, the product introduction can also function as a dedicated page for product introduction without functioning as a part of the FAQ search site. In this way, the present service can be applied not only to FAQs, but also to predetermined words, phrases, or sentences that are presented to the user in order to achieve the user's predetermined purpose, as described above. In the above-described embodiment, the users inputs the keyword K on the premise that he/she intends to input his/her intention in the form of the question sentence. However, the user may be presented with the guidance sentence that is desired (intended) by the user without being limited to the question sentence as long as it expresses the user's own intention.

Figure 13:
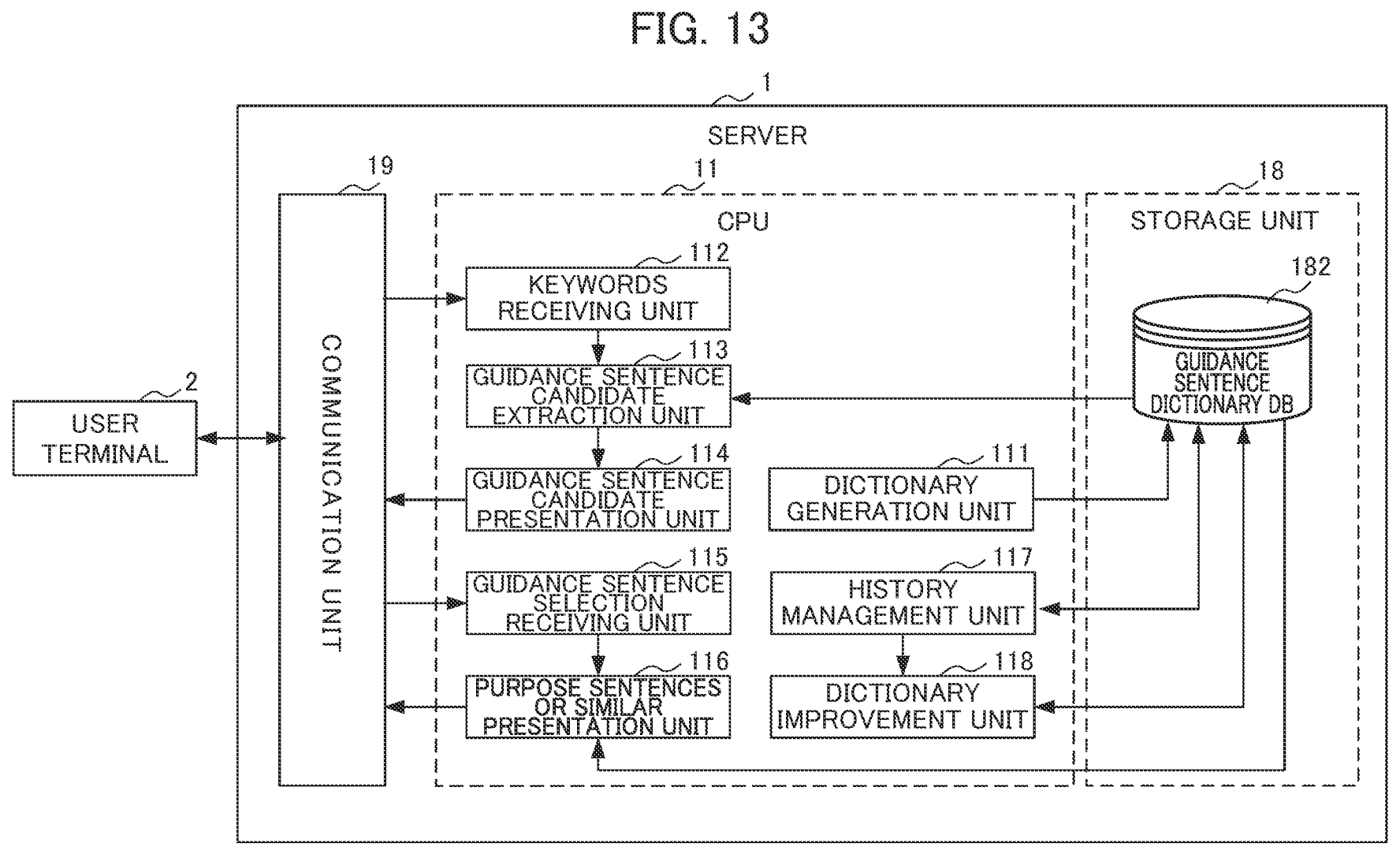

A description will be made with reference to FIG. 13 with respect to a functional configuration of the server 1 that presents such guidance sentence candidates and goal sentences or similar T1. FIG. 13 is a functional block diagram showing an example of a functional configuration of the server shown in FIG. 5 for executing processing of searching and presenting goal sentences or similar to the user.

As shown in FIG. 6, when the server 1 executes the guidance sentence dictionary generation processing, the CPU 11 functions as a dictionary generation unit 111. Further, when the server 1 executes the goal sentences or similar extraction processing, the CPU 11 functions as a keyword or the like receiving unit 112, a guidance sentence candidate extraction unit 113, a guidance sentence candidate presentation unit 114, a guidance sentence selection receiving unit 115, and a goal sentences or similar presentation unit 116. Further, when the server 1 executes the guidance sentence dictionary improvement processing, the CPU 11 functions as a history management unit 117 and a dictionary improvement unit 118.

Further, a guidance sentence dictionary DB 182 is provided in one region of the storage unit 18 of the server 1. The guidance sentence dictionary DB 182 stores a guidance sentence dictionary.

The dictionary generation unit 111 stores the keyword K, the guidance sentence candidate C, and the goal sentences or similar T1 in the guidance sentence dictionary of the guidance sentence dictionary DB 182 in association with each other so as to extract the guidance sentence candidate C including the keyword K, which is a word related to a total or constituent elements of the goal sentences or similar T1 and has a higher degree of generality when the keyword K is input into the search box B. Thus, a guidance sentence dictionary is generated such that the user who searches for the goal sentences or similar T1 can easily find desired information.

The keyword or the like receiving unit 112 receives the keyword K input into the search box B. Specifically, for example, when the keyword K "children" or "educational funds" is input into the search box B in the example of the above-described educational endowment insurance, the keyword or the like receiving unit 112 receives such a keyword.

The guidance sentence candidate extraction unit 113 extracts, from the guidance sentence dictionary of the guidance sentence dictionary DB 181, one or more guidance sentence candidates C containing the keyword K input into the search box B as at least a part.

The guidance sentence candidate presentation unit 114 presents one or more guidance sentence candidates C, which are extracted by the guidance sentence candidate extraction unit 113, to the user. Specifically, the guidance sentence candidate presentation unit 114 presents one or more guidance sentence candidates C, which are extracted by the guidance sentence candidate extraction unit 113, to the user by executing control to display them on the user terminal 2.

When one guidance sentence candidate C is selected from one or more guidance sentence candidates C presented to the user by the guidance sentence candidate presentation unit 114, the guidance sentence selection receiving unit 115 decides the selected guidance sentence candidate as a guidance sentence desired from the user.

The goal sentences or similar presentation unit 116 extracts the goal sentences or similar T1 associated with the guidance sentence candidate C, which is decided as the guidance sentence desired from the user by the guidance sentence selection receiving unit 115, and presents it to the user. Specifically, the goal sentences or similar presentation unit 116 extracts the sentences on the FAQ screen as the goal sentences or similar T1 associated with the decided guidance sentence candidate C, and presents the extracted sentences to the user by executing control to display the extracted sentences on the user terminal 2. Thus, the user can quickly solve the problem by referring to the displayed sentences on the FAQ screen. In addition, the goal sentences or similar presentation unit 116 further extracts, as goal sentences or similar T1, information on a person concerned with the previously extracted goal sentences or similar T1 and an organization to which the person concerned belongs, and presents it to the user.

The history management unit 117 manages, as history information, the keyword K received by the keyword or the like receiving unit 112, the guidance sentence candidate C selected by the user from the one or more guidance sentence candidates C presented to the user by the guidance sentence candidate presentation unit 114, and the goal sentences or similar T1 presented to the user by the goal sentences or similar presentation unit 116 in response to the selection. Further, the history management unit 117 extracts the keyword K received by the keyword or the like receiving unit 112, but the keyword K for which goal sentences or similar T1 not selected by the user is not presented by the goal sentences or similar presentation unit 116.

When the guidance sentence candidate is not decided by the guidance sentence selection receiving unit 115 after being presented to the user by the guidance sentence candidate presentation unit 114 as history information by the history management unit 117, the dictionary improvement unit 118 improves the guidance sentence dictionary including an association relationship between the keyword K contained in the guidance sentence candidate C and the guidance sentence candidate C.

Thus, the user can select a guidance sentence candidate C corresponding to his/her intension from the guidance sentence candidates C containing the keyword K input by the user. As a result, the user is presented with an appropriate goal sentence or similar T1 reflecting his or her intention.

An example of the functional configuration of the server 1 has been described above in which the present service is applied not only to the FAQ but also to the goal sentence or similar including the product description. Features of the present service realized by the server 1 described above are summarized below.

It can be said that the search using the intention expansion of the present service is a search method that well fits behavior characteristics of the user. Specifically, the user is an amateur about the product (service) to be searched. Therefore, the user often does not understand technical terms that are usually used in FAQs and product descriptions. In other words, the user cannot recall keywords for searching using such technical terms. Furthermore, even if the technical terms are input as keywords, it is difficult for the user to select a correct answer (whether to match the user's own intention) from a list of articles that simply contain the keywords. Moreover, in reality, many users give up when the users cannot reach the goal sentence or similar T1 intended by his or her own after trying several times (about three times on average). As described above, the present service can solve such a problem.

In addition, it can be said that the search using the intention expansion of the present service is a mechanism for searching for a guidance sentence (question sentence) to be predicted, rather than searching the goal sentence or similar T1 as an answer from the keyword K input by the user. Specifically, even when the user is presented with an answer (goal sentence or similar T1) that the user wants to know, it is difficult for the user to select an appropriate sentence. In the present service, the user is presented with a question (guidance sentence) that the user is thinking about, and thus the user can easily make a selection. Thus, it is possible to improve a user's correct answer arrival rate.

The embodiment of the present invention has been described above, but the present invention is not limited to the above-described embodiment, and can be modified, improved and the like within the range that can achieve the object of the present invention.

For example, one sentence on the FAQ screen is displayed as a related sentence or similar W in the above-described embodiment, but two or more sentences may be displayed.

Further, for example, the present invention is not limited to the above-described specific example. For example, it is assumed that erroneous payment processing has been performed for three users who have used online payment. In this case, the three users input keywords K "trouble", "return the money", and "defective" into the search box B of the present FAQ site, and select the displayed question sentence candidates C, respectively. Then, the sentences on the same FAQ screen desired by the three users are presented to the three users, respectively.

Further, for example, according to the above-described embodiment, the question sentence candidate containing the word related to the predetermined word, phrase, or sentence and having a higher degree of generality is extracted when the word is input, but the present invention is not limited thereto. A question sentence candidate containing a word related to a predetermined word, phrase, or sentence and having a lower degree of generality or a similar degree of generality may be extracted when the word is input. Specifically, for example, when a work "delete" is input into the search box, a sentence containing the word "delete" may be extracted.

The system configuration shown in FIG. 4 and the hardware configuration of the server 1 shown in FIG. 5 are merely examples for achieving the object of the present invention, and are not particularly limited.

The functional block diagram shown in FIG. 6 is merely an example, and is not particularly limited. In other words, it is sufficient that the information processing system shown in FIG. 4 has a function capable of executing the above-described question sentence dictionary generation processing and related sentences or similar extraction processing as a whole, and what kind of functional blocks and database are used to realize such a function are not particularly limited to the example of FIG. 5.

Further, locations of the functional blocks and the database are not limited to those shown in FIG. 6, and may be arbitrary. In the example of FIG. 6, the question sentence dictionary generation processing, the related sentences or similar extraction processing, and the question sentence dictionary improvement processing are performed under the control of the CPU 11 of the server 1 shown in FIG. 5 constituting the information processing system of FIG. 4, but is not limited thereto. For example, at least part of the functional blocks and database arranged closer to the server 1 may be provided closer to the user terminal 2 or in another information processing device (not shown).

Further, the series of processes described above can be implemented by hardware, or can be implemented by software. One functional block may be implemented by hardware alone, software alone, or a combination thereof.

In a case where a series of processes is executed by software, a program forming such software is installed on, e.g., a computer from a network or a recording medium. The computer may be a computer incorporated into dedicated hardware. Alternatively, the computer may be a computer capable of executing various functions by installation of various programs, for example, a general-purpose smartphone or a personal computer of the server.

A recording medium including these programs may include, for example, not only a removable medium (not shown) distributed separately from an apparatus body for providing the programs to a user, but also a recording medium or the like provided to a user with the recording medium being incorporated into a device body in advance.

In the description, steps of writing a program recorded on the recording medium includes not only processes that are performed chronologically in that order, but also processes that are not necessarily chronologically processed and that are performed in parallel or individually.

In summary, the information processing device to which the present invention is applied can take various embodiments having the following configurations. In other words, an information processing device to which the present invention is applied includes: a dictionary generation unit (for example, the dictionary generation unit 101 in FIG. 6) that stores, such that a question sentence candidate (for example, the question sentence candidate C in FIG. 1, specifically, "product was defective" in FIG. 7, for example) containing a word (for example, the keyword K in FIG. 1, specifically, "defective product" in FIG. 7, for example) related to a predetermined word, phrase, or sentence (for example, a total or constituent elements of the sentences on the FAQ screen as the related sentences or similar W in FIG. 1, specifically, "guidance on refund method" in FIG. 7, for example) and having a higher degree of generality is extracted when the word is input, the word, the question sentence candidate, and information including the predetermined word, phrase, or sentence in a question sentence dictionary in association with each other.

In other words, the word, the question sentence candidate, and the information including the predetermined word, phrase, or sentence are stored as a question sentence dictionary in association with each other such that the question sentence candidate containing the word related to the predetermined word, phrase, or sentence and having a higher degree of generality is extracted when the word is input. Thus, the question sentence dictionary is generated such that the user who searches the FAQ can easily find desired information.

In addition, an information processing device to which the present invention is applied includes:

a dictionary generation unit that stores, such that a question sentence candidate containing a word related to a predetermined word, phrase, or sentence and having a lower degree of generality or a similar degree of generality is extracted when the word is input, the word, the question sentence candidate, and information including the predetermined word, phrase, or sentence in a question sentence dictionary in association with each other.

In other words, the word, the question sentence candidate, and information including the predetermined word, phrase, or sentence are stored as the question sentence dictionary in association with each other, such that the question sentence candidate containing the word related to the predetermined word, phrase, or sentence and having a lower degree of generality or a similar degree of generality is extracted when the word is input. Thus, the question sentence dictionary is generated such that the user who searches the FAQ can easily find desired information.

Further, an information processing device to which the present invention is applied includes:

a receiving unit (for example, the keyword or the like receiving unit 102 in FIG. 5) that receives a word (for example, the keyword K described above) related to a predetermined word, phrase, or sentence input by a user;

an extraction unit (for example, the question sentence candidate extraction unit 103 in FIG. that extracts one or more question sentence candidates containing the word as at least a part; a first presentation unit (for example, the question sentence candidate presentation unit 104 in FIG. that presents the one or more question sentence candidates, which are extracted by the extraction unit, to the user; and a second presentation unit (for example, the related sentences or similar presentation unit 106 in FIG. 5) that extracts, from the one or more question sentence candidates presented to the user by the first presentation unit, a predetermined word, phrase, or sentence corresponding to the question sentence candidate selected by the user.

In other words, when the word related to the predetermined word, phrase, or sentence input by the user is received, one or more question sentence candidates containing the word as at least a part is extracted. The one or more extracted question sentence candidates are presented to the user. From the one or more question sentence candidates presented to the user, the predetermined word, phrase, or sentence corresponding to the question sentence candidate selected by the user is extracted and presented to the user. Thus, the user who searches the FAQ can easily find desired information.

Further, the second presentation unit may further extract information on a person concerned related to the predetermined word, phrase, or sentence extracted in advance and present the information to the user.

In other words, information on the person concerned related to the predetermined word, phrase, or sentence extracted in advance and an organization to which the person concerned belongs is extracted and presented to the user. Thus, the user who searches the FAQ can more easily find desired information.

Further, the second presentation unit may further extract information on the organization to which the person concerned related to the predetermined word, phrase, or sentence extracted in advance belongs and present the information to the user.

In other words, the information on the organization to which the person concerned related to the predetermined word, phrase, or sentence extracted in advance belongs is extracted and presented to the user. Thus, the user who searches the FAQ can more easily find desired information.

Further, the information processing device may further include a management unit (for example, the history management unit 107 in FIG. 5) that manages, as history information, the word related to the predetermined word, phrase, or sentence received by the receiving unit, the question sentence candidate selected by the user from the one or more question sentence candidates presented to the user by the first presentation unit, and the predetermined word, phrase, or sentence presented to the user by the second presentation unit in response to the selection, and the management unit may further extract a word received by the receiving unit but not selected by the user, or a word for which the predetermined word, phrase, or sentence is not presented by the second presentation unit.

In other words, the received word related to the predetermined word, phrase, or sentence, the question sentence candidate selected by the user from the one or more question sentence candidates presented to the user, and the predetermined word, phrase, or sentence presented to the user in response to the selection are managed, as history information. Then, the word received but not selected by the user, or the word for which the predetermined word, phrase, or sentence is not presented is extracted. Thus, it is possible to extract information for fully improving the present FAQ search site. Further, since products and services can be determined that are desired by the user but are not provided, it is possible to contribute to creation of new products and services desired by the user.

Further, an information processing device to which the present invention is applied includes a dictionary generation unit (for example, the dictionary generation unit 111 in FIG. 13) that uses, as a goal sentence or similar, a predetermined word, phrase, or sentence presented to a user in order to achieve a predetermined purpose of the user and stores the word, a guidance sentence candidate, and the goal sentence or similar in a guidance sentence dictionary in association with each other, such that the guidance sentence candidate intended by the user to reach the goal sentence or similar and containing a word (corresponding to a word (keyword K) that comes to mind in FIG. 7) related to the goal sentence or similar and having a higher degree of generality or a similar word is extracted when the word is input.

Further, an information processing device may include a dictionary generation unit that uses, as a goal sentence or similar, a predetermined word, phrase, or sentence presented to a user in order to achieve a predetermined purpose of the user and stores the word, a guidance sentence candidate, and the goal sentence or similar in a guidance sentence dictionary in association with each other, such that the guidance sentence candidate intended by the user to reach the goal sentence or similar and containing a word (corresponding to a word that comes to mind in FIG. 7) related to the goal sentence or similar but having a lower degree of generality or a similar degree of generality or a similar word is extracted when the word is input.

Further, the guidance sentence candidate may be a question sentence candidate, and the guidance sentence dictionary may be a question sentence dictionary.

Further, an information processing device to which the present invention is applied includes:

a receiving unit (for example, the keyword or the like receiving unit 112 in FIG. 13) that uses, as a goal sentence or similar, a predetermined word, phrase, or sentence presented to a user in order to achieve a predetermined purpose of the user and receives a word related to the goal sentence or similar;

an extraction unit (for example, the guidance sentence candidate extraction unit 113 in FIG. 13) that extracts one or more guidance sentence candidates containing the word or a similar word as at least a part, from a guidance sentence dictionary in which a plurality of guidance sentence candidates intended by the user to reach the goal sentence or similar are associated with the goal sentence or similar and are registered in advance;

a first presentation unit (for example, the guidance sentence candidate presentation unit 114 in FIG. 13) that presents the one or more guidance sentence candidates themselves extracted by the extraction unit or a guidance sentence candidate processed based thereon (for example, a guidance sentence candidate in which a guidance sentence candidate "a product is defective product" extracted with a keyword "bad product" as a casual expression of a defective product is processed as "a product is a bad product" processed based thereon) to the user; and a second presentation unit (for example, the goal sentences or similar presentation unit 116 in FIG. 13) that extracts, from the guidance sentence dictionary, the guidance sentence candidate itself selected by the user from the one or more guidance sentence candidates presented to the user by the first presentation unit or the goal sentence or similar associated with a processing source thereof and presents the extracted guidance sentence candidate itself or goal sentence or similar to the user.

Further, the guidance sentence candidate may be a question sentence candidate, and the guidance sentence dictionary may be a question sentence dictionary.

Further, the second presentation unit may further extract information on a person concerned related to the goal sentence or similar extracted in advance and present the information to the user.

Further, the second presentation unit may further extract information on an organization to which the person concerned related to the goal sentence or similar extracted in advance belongs and present the information to the user.

The information processing device may further include a management unit (for example, the history management unit 117 in FIG. 13) that manages, as history information, the word received by the receiving unit, the question sentence candidate selected by the user from the one or more question sentence candidates presented to the user by the first presentation unit, and the goal sentence or similar presented to the user by the second presentation unit in response to the selection, and the management unit may further extract a word received by the receiving unit but not selected as the guidance sentence candidate by the user, or the word for which the goal sentence or similar is not presented by the second presentation unit.

EXPLANATION OF REFERENCE NUMERALS

1 . . . server, 2 . . . user terminal, 11 . . . CPU, 12 . . . ROM, 13 . . . RAM, 14 . . . bus, 15 . . . input/output interface, 16 . . . input unit, 17 . . . output unit, 18 . . . storage unit, 19 . . . communication unit, 20 . . . drive, 40 . . . removable medium, 101 . . . dictionary generation unit, 102 . . . keyword receiving unit, 103 . . . question sentence candidate extraction unit, 104 . . . question sentence candidate presentation unit, 105 . . . question sentence decision unit, 106 . . . related sentences or similar presentation unit, 107 . . . history management unit, 108 . . . dictionary improvement unit, 181 . . . question sentence dictionary DB, 111 . . . dictionary generation unit, 112 . . . keyword receiving unit, 113 . . . guidance sentence candidate extraction unit, 114 . . . guidance sentence candidate presentation unit, 115 . . . guidance sentence selection receiving unit, 116 . . . goal sentences or similar presentation unit, 117 . . . history management unit, 118 . . . dictionary improvement unit, 182 . . . question sentence dictionary DB, B . . . search box, K . . . keyword, C . . . question sentence candidate, W . . . related sentence or similar, NW . . . network It is claimed:

1. An information processing device for presenting a character string consisting of a predetermined word, phrase, or sentence to a user as a goal sentence to achieve a predetermined purpose of the user, the information processing device comprising:

a processor coupled to a storage unit, having control instructions stored thereon, which, when executed by the processor, causes the information processing device to perform actions comprising:

generating a guidance sentence dictionary stored in the storage unit, in which a plurality of guidance sentence candidates associated with a plurality of goal sentences are stored;

receiving a word related to the goal sentence;

extracting one or more guidance sentence candidates containing the word or a similar word from the guidance sentence dictionary;

presenting to the user the one or more extracted guidance sentence candidates;

receiving a user selection of one of the guidance sentence candidates;

extracting the goal sentence associated with the guidance sentence candidate selected by the user; from the guidance sentence dictionary presenting the goal sentence associated with the guidance sentence candidate selected by the user to the user; and maintaining histories of the extracted guidance sentence candidates, user selected guidance sentence candidates, guidance sentence candidates not selected by the user and related goal sentences as history information to improve success of the extraction and presenting of guidance sentence candidates from the guidance sentence dictionary that achieve the predetermined purpose of the user.

2. The information processing device according to claim 1, wherein the guidance sentence candidate is used interchangeably as a question sentence candidate, and the guidance sentence dictionary is used interchangeably as a question sentence dictionary.

3. The information processing device according to claim 2, wherein the extracting the goal sentence includes further extracting information on a person concerned related to the goal sentence extracted in advance and the presenting the goal sentence includes presenting the information to the user.

4. The information processing device according to claim 2, wherein the extracting the goal sentence includes further extracting information on an organization to which a person concerned related to the goal sentence extracted in advance belongs and the presenting the goal sentence includes presenting the information to the user.

5. The information processing device according to claim 1, wherein the managing histories further includes improving the guidance sentence dictionary that affect an extraction of the one or more guidance sentence candidates and the goal sentence so that the actions are more likely to achieve the predetermined purpose of the user; and wherein the improving includes changing at least one of the words contained in the guidance sentence candidates and the guidance sentence candidates themselves, or changing the correspondence between them, so that, if the user does not select a guidance sentence candidate after the guidance sentence candidates are presented to the user during the presenting, the user can select a guidance sentence candidate that corresponds to the user own intention from one or more guidance sentence candidates are associated with the words input by the user.

6. An information processing method executed by an information processing device for presenting a character string consisting of a predetermined word, phrase, or sentence to a user as a goal sentence to achieve a predetermined purpose of the user, the information processing method comprising:

generating a guidance sentence dictionary stored in a storage unit, in which a plurality of guidance sentence candidates associated with a plurality of goal sentences are stored;

receiving a word related to the goal sentence;

extracting one or more guidance sentence candidates containing the word or a similar word from the guidance sentence dictionary;

presenting to the user the one or more guidance sentence candidates extracted;

receiving a user selection of one of the guidance sentence candidates;

extracting the goal sentence associated with the guidance sentence candidate selected by the user from the guidance sentence dictionary;

presenting the goal sentence associated with the guidance sentence candidate selected by the user to the user; and maintaining histories of the extracted guidance sentence candidates, user selected guidance sentence candidates, guidance sentence candidates not selected by the user and related goal sentences as history information to improve success of the extraction and presenting of guidance sentence candidates from the guidance sentence dictionary that achieve the predetermined purpose of the user.

7. A non-transitory computer readable medium storing a program causing a computer as an information processing device for presenting a character string consisting of a predetermined word, phrase, or sentence to a user as a goal sentence, to achieve a predetermined purpose of the user, to execute a control processing comprising:

generating a guidance sentence dictionary stored in a storage unit, in which a plurality of guidance sentence candidates associated with a plurality of goal sentences are stored;

receiving a word related to the goal sentence;

extracting one or more guidance sentence candidates containing the word or a similar word, from the guidance sentence dictionary;

presenting to the user the one or more guidance sentence candidates extracted;

receiving a user selection of one of the guidance sentence candidates;

extracting the goal sentence associated with the guidance sentence candidate selected by the user from the guidance sentence dictionary;

presenting the goal sentence associated with the guidance sentence candidate selected by the user to the user; and maintaining histories of the extracted guidance sentence candidates, user selected guidance sentence candidates, guidance sentence candidates not selected by the user and related goal sentences as history information to improve success of the extraction and presenting of guidance sentence candidates from the guidance sentence dictionary that achieve the predetermined purpose of the user.

* * * * *